US007006848B2

(12) United States Patent
Ling et al.

(10) Patent No.: US 7,006,848 B2
(45) Date of Patent: *Feb. 28, 2006

(54) METHOD AND APPARATUS FOR UTILIZING CHANNEL STATE INFORMATION IN A WIRELESS COMMUNICATION SYSTEM

(75) Inventors: Fuyun Ling, Beijing (CN); Jay R. Walton, Westford, MA (US); Steven J. Howard, Ashland, MA (US); Mark Wallace, Bedford, MA (US); John W. Ketchum, Harvard, MA (US)

(73) Assignee: Qualcomm Incorporated, San Diego, CA (US)

( * ) Notice: Subject to any disclaimer, the term of this patent is extended or adjusted under 35 U.S.C. 154(b) by 659 days.

This patent is subject to a terminal disclaimer.

(21) Appl. No.: 09/956,449

(22) Filed: Sep. 18, 2001

(65) Prior Publication Data

US 2003/0003880 A1 Jan. 2, 2003

Related U.S. Application Data

(60) Provisional application No. 09/816,481, filed on Mar. 23, 2001.

(51) Int. Cl.
 *H04M 1/00* (2006.01)
(52) U.S. Cl. .................... 455/562.1; 455/101; 375/267
(58) Field of Classification Search ................ 455/92, 455/562.1, 452.2, 101; 375/260, 267, 296, 375/347, 349
 See application file for complete search history.

(56) References Cited

U.S. PATENT DOCUMENTS

| | | | |
|---|---|---|---|
| 5,056,109 | A | 10/1991 | Gilhousen et al. |
| 5,265,119 | A | 11/1993 | Gilhousen et al. |
| 5,799,005 | A | 8/1998 | Soliman |
| 5,903,554 | A | 5/1999 | Saints |
| 6,097,972 | A | 8/2000 | Saints et al. |

OTHER PUBLICATIONS

Raleigh et al. ; High capacity Wireless communicating using spatial subchannels; Mar. 5, 1998; WO 98/09381.*

* cited by examiner

*Primary Examiner*—Melur Ramakrishnaiah
(74) *Attorney, Agent, or Firm*—Dmitry Milikovsky; Micky Minhas

(57) ABSTRACT

Techniques for transmitting data from a transmitter unit to a receiver unit in a multiple-input multiple-output (MIMO) communication system. In one method, at the receiver unit, a number of signals are received via a number of receive antennas, with the received signal from each receive antenna comprising a combination of one or more signals transmitted from the transmitter unit. The received signals are processed with a spatial, a space-time, or a full-CSI technique to derive channel state information (CSI) indicative of the characteristics of a number of transmission channels used for data transmission. The CSI (which may comprise SNR estimates, data rate indicators, complex channel gains, or some other information) is transmitted back to the transmitter unit. At the transmitter unit, the CSI is received and data for transmission to the receiver unit is processed (e.g., coded and modulated) based on the received CSI.

52 Claims, 10 Drawing Sheets

METHOD AND APPARATUS FOR UTILIZING CHANNEL STATE INFORMATION IN A WIRELESS COMMUNICATION SYSTEM

CROSS REFERENCE

This application claims priority from U.S. application Ser. No. 09/816,481, filed Mar. 23, 2001, entitled "Method and Apparatus for Utilizing State Information In A Wireless Communication System," and currently assigned to the assignee of the present application.

BACKGROUND

1. Field

The present invention relates generally to data communication, and more specifically to techniques for utilizing (full or partial) channel state information to provide improved performance for a wireless communication system.

2. Background

Wireless communication systems are widely deployed to provide various types of communication such as voice, data, and so on. These systems may be based on code division multiple access (CDMA), time division multiple access (TDMA), orthogonal frequency division modulation (OFDM), or some other modulation techniques. OFDM systems may provide high performance for some channel environments.

In a terrestrial communication system (e.g., a cellular system, a broadcast system, a multi-channel multi-point distribution system (MMDS), and others), an RF modulated signal from a transmitter unit may reach a receiver unit via a number of transmission paths. The characteristics of the transmission paths typically vary over time due to a number of factors such as fading and multipath.

To provide diversity against deleterious path effects and improve performance, multiple transmit and receive antennas may be used. If the transmission paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmissing. A MIMO channel formed by the $N_T$ transmit and $N_R$ receive antennas may be decomposed into $N_C$ independent channels, with $N_C \geq \min\{N_T, N_R\}$. Each of the $N_C$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

There is therefore a need in the art for techniques to utilize channel state information (CSI) to take advantage of the additional dimensionalities created by a MIMO system to provide improved system performance.

SUMMARY

Aspects of the invention provide techniques to process a set of received signals in a multiple-input multiple-output (MIMO) communication system to recover the transmitted signals, and to estimate the characteristics of a MIMO channel. Various receiver processing techniques may be used to process the received signals to derive channel state information (CSI) indicative of the characteristics of the transmission channels used for data transmission. The CSI is reported back to the transmitter system and used to adjust the signal processing (e.g., coding, modulation, and so on). In this manner, high performance is achieved based on the determined channel conditions.

A specific embodiment of the invention provides a method for transmitting data from a transmitter unit to a receiver unit in a MIMO communication system. In accordance with the method, at the receiver unit, a number of signals are received via a number of receive antennas, with the received signal from each receive antenna comprising a combination of one or more signals transmitted from the transmitter unit. The received signals are processed with a linear spatial technique, a space-time technique, or a full-CSI technique to derive CSI indicative of the characteristics of a number of transmission channels used for data transmission. Linear spatial techniques include a channel correlation matrix inversion (CCMI) technique, a minimum mean square error (MMSE) technique, and possibly others. Space-time techniques include a minimum mean square error linear equalizer (MMSE-LE) technique, a decision feedback equalizer (DFE) technique, and others. The CSI is encoded and transmitted back to the transmitter unit. At the transmitter unit, the CSI from the receiver unit is received and data for transmission to the receiver unit is processed based on the received CSI to provide modulation symbols. The modulation symbols are then conditioned to generate a number of signals suitable for transmission from the transmitter unit to the receiver unit.

The reported CSI may include full CSI or partial CSI. Full CSI includes sufficient full-bandwidth characterization (e.g., the amplitude and phase across the useable bandwidth) of the propagation path between all pairs of transmit and receive antennas. Partial CSI may include, for example, the signal-to-noise-plus-interference ratios (SNRs) of the transmission channels. At the transmitter unit, the data for each transmission channel may be coded based on the CSI (e.g., the SNR estimate) for the transmission channel, and the coded data for each transmission channel may be modulated in accordance with a modulation scheme selected based on the CSI. For full-CSI processing, the modulation symbols are also preconditioned prior to transmission in accordance with the received CSI.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
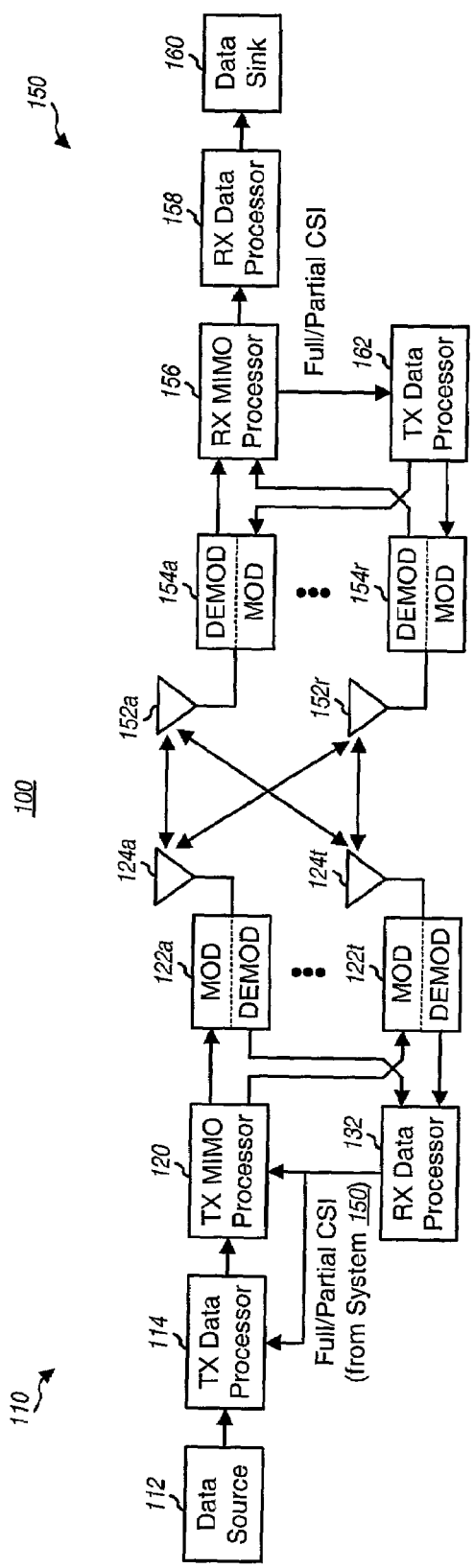
FIG. 1 is a diagram of a multiple-input multiple-output (MIMO) communication system capable of implementing various aspects and embodiments of the invention.

FIG. 1 is a diagram of a multiple-input multiple-output (MIMO) communication system 100 capable of implementing various aspects and embodiments of the invention. System 100 includes a first system 110 in communication with a second system 150. System 100 can be operated to employ a combination of antenna, frequency, and temporal diversity (described below) to increase spectral efficiency, improve performance, and enhance flexibility. In an aspect, system 150 can be operated to determine the characteristics of the communication link and to report channel state information (CSI) indicative of the determined channel characteristics back to system 110, and system 110 can be operated to adjust the processing (e.g., encoding and modulation) of data prior to transmission based on the reported CSI.

MIMO system 100 employs multiple antennas at both the transmit and receive ends of the communication link. These transmit and receive antennas may be used to provide various forms of spatial diversity (i.e., antenna diversity), including transmit diversity and receive diversity. Spatial diversity is characterized by the use of multiple transmit antennas and one or more receive antennas. Transmit diversity is characterized by the transmission of data over multiple transmit antennas. Typically, additional processing is performed on the data transmitted from the transmit antennas to achieved the desired diversity. For example, the data transmitted from different transmit antennas may be delayed or reordered in time, coded and interleaved across the available transmit antennas, and so on. Receive diversity is characterized by the reception of the transmitted signals on multiple receive antennas, and diversity is achieved by simply receiving the signals via different signal paths.

System 100 may be operated in a number of different communication modes, with each communication mode employing antenna, frequency, or temporal diversity, or a combination thereof. The communication modes may include, for example, a "diversity" communication mode and a "MIMO" communication mode. The diversity communication mode employs diversity to improve the reliability of the communication link. In a common application of the diversity communication mode, which is also referred to as a "pure" diversity communication mode, data is transmitted from all available transmit antennas to a recipient receiver system. The pure diversity communications mode may be used in instances where the data rate requirements are low or when the SNR is low, or when both are true. The MIMO communication mode employs antenna diversity at both ends of the communication link (i.e., multiple transmit antennas and multiple receive antennas) and is generally used to both improve the reliability and increase the capacity of the communication link. The MIMO communication mode may further employ frequency and/or temporal diversity in combination with the antenna diversity.

System 100 may further utilize orthogonal frequency division modulation (OFDM), which effectively partitions the operating frequency band into a number of ($N_L$) frequency subchannels (i.e., frequency bins). At each time slot (i.e., a particular time interval that may be dependent on the bandwidth of the frequency subchannel), a modulation symbol may be transmitted on each of the $N_L$ frequency subchannels.

System 100 may be operated to transmit data via a number of transmission channels. As noted above, a MIMO channel may be decomposed into $N_C$ independent channels, with $N_C \geq \min\{N_T, N_R\}$. Each of the $N_C$ independent channels is also referred to as a spatial subchannel of the MIMO channel. For a MIMO system not utilizing OFDM, there is typically only one frequency subchannel and each spatial subchannel may be referred to as a "transmission channel". For a MIMO system utilizing OFDM, each spatial subchannel of each frequency subchannel may be referred to as a transmission channel. And for an OFDM system not utilizing MIMO, there is only one spatial subchannel and each frequency subchannel may be referred to as a transmission channel.

A MIMO system can provide improved performance if the additional dimensionalities created by the multiple transmit and receive antennas are utilized. While this does not necessarily require knowledge of CSI at the transmitter, increased system efficiency and performance are possible when the transmitter is equipped with CSI, which is descriptive of the transmission characteristics from the transmit antennas to the receive antennas. CSI may be categorized as either "full CSI" or "partial CSI".

Full CSI includes sufficient characterization (e.g., the amplitude and phase) across the entire system bandwidth (i.e., each frequency subchannel) for the propagation path between each transmit-receive antenna pair in the ($N_T \times N_R$) MIMO matrix. Full-CSI processing implies that (1) the channel characterization is available at both the transmitter and receiver, (2) the transmitter computes eigenmodes for the MIMO channel (described below), determines modulation symbols to be transmitted on the eigenmodes, linearly preconditions (filters) the modulation symbols, and transmits the preconditioned modulation symbols, and (3) the receiver performs a complementary processing (e.g., spatial matched filter) of the linear transmit processing based on the channel characterization to compute the $N_C$ spatial matched filter coefficients needed for each transmission channel (i.e., each eigenmode). Full-CSI processing further entails processing the data (e.g., selecting the proper coding and modulation schemes) for each transmission channel based on the channel's eigenvalue (described below) to derive the modulation symbols.

Partial CSI may include, for example, the signal-to-noise-plus-interference ratios (SNRs) of the transmission channels (i.e., the SNR for each spatial subchannel for a MIMO system without OFDM, or the SNR for each spatial subchannel of each frequency subchannel for a MIMO system with OFDM). Partial-CSI processing may imply processing the data (e.g., selecting the proper coding and modulation schemes) for each transmission channel based on the channel's SNR.

Referring to FIG. 1, at system 110, a data source 112 provides data (i.e., information bits) to a transmit (TX) data processor 114, which encodes the data in accordance with a particular coding scheme, interleaves (i.e., reorders) the encoded data based on a particular interleaving scheme, and maps the interleaved bits into modulation symbols for one or more transmission channels used for transmitting the data. The encoding increases the reliability of the data transmission. The interleaving provides time diversity for the coded bits, permits the data to be transmitted based on an average signal-to-noise-plus-interference ratio (SNR) for the transmission channels used for the data transmission, combats fading, and further removes correlation between coded bits used to form each modulation symbol. The interleaving may further provide frequency diversity if the coded bits are transmitted over multiple frequency subchannels. In accordance with an aspect of the invention, the encoding, interleaving, and symbol mapping (or a combination thereof) are performed based on the full or partial CSI available to system 110, as indicated in FIG. 1.

The encoding, interleaving, and symbol mapping at transmitter system 110 can be performed based on numerous schemes. One specific scheme is described in U.S patent application Ser. No. 09/776,075, entitled "CODING SCHEME FOR A WIRELESS COMMUNICATION SYSTEM," filed Feb. 1, 2001, assigned to the assignee of the present application and incorporated herein by reference. Other schemes are described in further detail below.

A TX MIMO processor 120 receives and processes the modulation symbols from TX data processor 114 to provide symbols suitable for transmission over the MIMO channel. The processing performed by TX MIMO processor 120 is dependent on whether full or partial CSI processing is employed.

For full-CSI processing, TX MIMO processor 120 may demultiplex and precondition the modulation symbols. And for partial-CSI processing, TX MIMO processor 120 may simply demultiplex the modulation symbols. The full and partial-CSI MIMO processing is described in further detail below. For a MIMO system employing full-CSI processing but not OFDM, TX MIMO processor 120 provides a stream of preconditioned modulation symbols for each transmit antenna, one preconditioned modulation symbol per time slot. Each preconditioned modulation symbol is a linear (and weighted) combination of $N_C$ modulation symbols at a given time slot for the $N_C$ spatial subchannels, as described in further detail below. For a MIMO system employing full-CSI processing and OFDM, TX MIMO processor 120 provides a stream of preconditioned modulation symbol vectors for each transmit antenna, with each vector including $N_L$ preconditioned modulation symbols for the $N_L$ frequency subchannels for a given time slot. For a MIMO system employing partial-CSI processing but not OFDM, TX MIMO processor 120 provides a stream of modulation symbols for each transmit antenna, one modulation symbol per time slot. And for a MIMO system employing partial-CSI processing and OFDM, TX MIMO processor 120 provides a stream of modulation symbol vectors for each transmit antenna, with each vector including $N_L$ modulation symbols for the $N_L$ frequency subchannels for a given time slot. For all cases described above, each stream of (either unconditioned or preconditioned) modulation symbols or modulation symbol vectors is received and modulated by a respective modulator (MOD) 122, and transmitted via an associated antenna 124.

In the embodiment shown in FIG. 1, receiver system 150 includes a number of receive antennas 152 that receive the transmitted signals and provide the received signals to respective demodulators (DEMOD) 154. Each demodulator 154 performs processing complementary to that performed at modulator 122. The demodulated symbols from all demodulators 154 are provided to a receive (RX) MIMO processor 156 and processed in a manner described below. The received modulation symbols for the transmission channels are then provided to a RX data processor 158, which performs processing complementary to that performed by TX data processor 114. In a specific design, RX data processor 158 provides (soft) bit values indicative of the received modulation symbols, deinterleaves the bit values, and decodes the deinterleaved values to generate decoded bits, which are then provided to a data sink 160. The received symbol de-mapping, deinterleaving, and decoding are complementary to the symbol mapping, interleaving, and encoding performed at transmitter system 110. The processing by receiver system 150 is described in further detail below.

The spatial subchannels of a MIMO system (or more generally, the transmission channels in a MIMO system with or without OFDM) typically experience different link conditions (e.g., different fading and multipath effects) and may further achieve different SNRs. Consequently, the capacity of the transmission channels may be different from channel to channel. This capacity may be quantified by the information bit rate (i.e., the number of information bits per modulation symbol) that may be transmitted on each transmission channel for a particular level of performance. Moreover, the link conditions typically vary with time. As a result, the supported information bit rates for the transmission channels also vary with time. To more fully utilize the capacity of the transmission channels, CSI descriptive of the link conditions may be determined (typically at the receiver unit) and provided to the transmitter unit so that the processing can be adjusted (or adapted) accordingly. Aspects of the invention provide techniques to determine and utilize full or partial CSI to provide improved system performance.

MIMO Transmitter System with Partial-CSI Processing

Figure 2A:
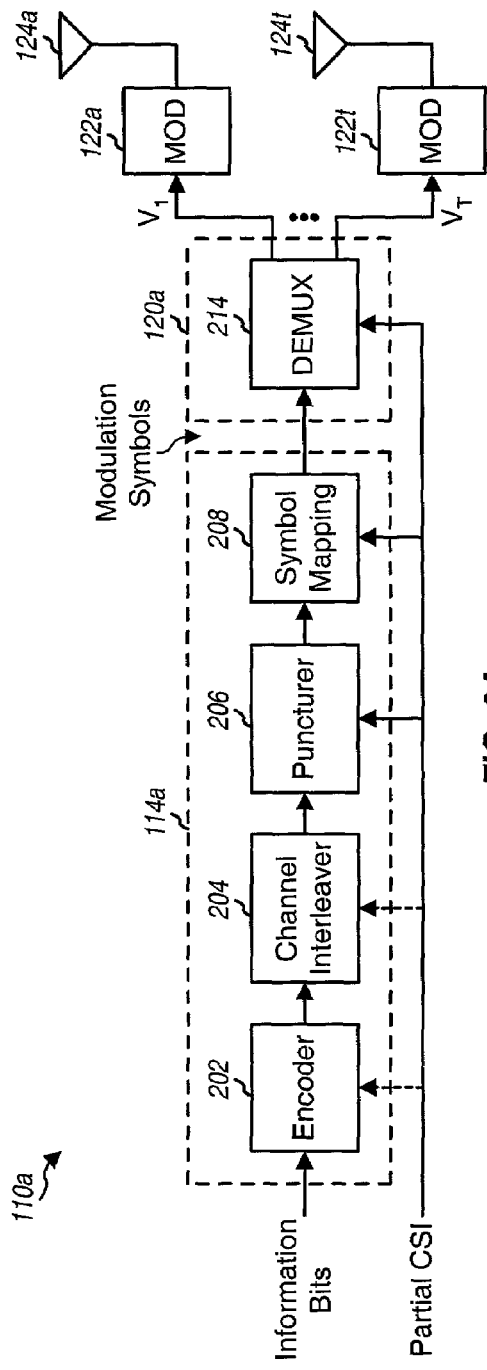
FIGS. 2A and 2B are block diagrams of an embodiment of a MIMO transmitter system capable of performing partial-CSI processing and full-CSI processing, respectively.

FIG. 2A is a block diagram of an embodiment of a MIMO transmitter system 110a, which is one embodiment of the transmitter portion of system 110 in FIG. 1. Transmitter system 110a (which does not utilize OFDM) is capable of adjusting its processing based on the available partial CSI (e.g., reported by receiver system 150). System 110a includes (1) a TX data processor 114a that receives and processes information bits to provide modulation symbols and (2) a TX MIMO processor 120a that demultiplexes the modulation symbols for the $N_T$ transmit antennas.

TX data processor 114a is one embodiment of TX data processor 114 in FIG. 1, and many other designs may also be used for TX data processor 114 and are within the scope of the invention. In the specific embodiment shown in FIG. 2A, TX data processor 114a includes an encoder 202, a channel interleaver 204, a puncturer 206, and a symbol mapping element 208. Encoder 202 receives and encodes the information bits in accordance with a particular coding scheme to provide coded bits. The coding scheme may employ a convolutional code, a Turbo code, a block code, a concatenated code, or any other code or combination of codes. Channel interleaver 204 interleaves the coded bits based on a particular interleaving scheme to provide diversity. Puncturer 206 then punctures zero or more of the interleaved coded bits to provide the desired number of coded bits. And symbol mapping element 208 maps the unpunctured coded bit into modulation symbols for one or more transmission channels used for transmitting the data.

Although not shown in FIG. 2A for simplicity, pilot data (e.g., data of known pattern) may also be encoded and multiplexed with the processed information bits. The processed pilot data may be transmitted (e.g., in a time division multiplexed (TDM) or a code division multiplexed (CDM) manner) in all or a subset of the transmission channels used to transmit the information bits. The pilot data may be used at the receiver to perform channel estimation, as is known in the art and described in further detail below.

As shown in FIG. 2A, the encoding and modulation may be adjusted based on the available partial CSI. In an embodiment, adaptive encoding is achieved by using a fixed base code (e.g., a rate ⅓ Turbo code) and adjusting the puncturing to achieve the desired code rate, as supported by the SNR of the transmission channel used to transmit the data. For this scheme, the puncturing may be performed after the channel interleaving. In another embodiment, different coding schemes may be used based on the available partial CSI (as indicated by the dashed arrow into block 202). For example, each of the data streams may be coded with an independent code. With this coding scheme, a "successive nulling/equalization and interference cancellation" receiver processing scheme may be used to detect and decode the data streams to derive a more reliable estimate of the transmitted data streams. One such receiver processing scheme is described in U.S. patent application Ser. No. 09/854,235, entitled "METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION," filed May 11, 2001, assigned to the assignee of the present application, and by P. W. Wolniansky, et al in a paper entitled "V-BLAST: An Architecture for Achieving Very High Data Rates over the Rich-Scattering Wireless Channel", Proc. ISSSE-98, Pisa, Italy, both of which are incorporated herein by reference.

For each transmission channel, symbol mapping element 208 can be designed to group sets of unpunctured coded bits to form non-binary symbols, and to map each non-binary symbol into a point in a signal constellation corresponding to a particular modulation scheme (e.g., QPSK, M-PSK, M-QAM, or some other scheme) selected for the transmission channel. Each mapped signal point corresponds to a modulation symbol.

The number of information bits that may be transmitted for each modulation symbol for a particular level of performance (e.g., one percent packet error rate (PER)) is dependent on the SNR of the transmission channel. Thus, the coding scheme and modulation scheme for each transmission channel may be selected based on the available partial CSI. The channel interleaving may also be adjusted based on the available partial CSI (as indicated by the dashed arrow into block 204).

Table 1 lists various combinations of coding rate and modulation scheme that may be used for a number of SNR ranges. The supported bit rate for each transmission channel may be achieved using any one of a number of possible combinations of coding rate and modulation scheme. For example, one information bit per modulation symbol may be achieved using (1) a coding rate of ½ and QPSK modulation, (2) a coding rate of ⅓ and 8-PSK modulation, (3) a coding rate of ¼ and 16-QAM, or some other combination of coding rate and modulation scheme. In Table 1, QPSK, 16-QAM, and 64-QAM are used for the listed SNR ranges. Other modulation schemes such as 8-PSK, 32-QAM, 128-QAM, and so on, may also be used and are within the scope of the invention.

TABLE 1

| SNR Range | # of Information Bits/Symbol | Modulation Symbol | # of Coded Bits/Symbol | Coding Rate |
|---|---|---|---|---|
| 1.5–4.4 | 1 | QPSK | 2 | 1/2 |
| 4.4–6.4 | 1.5 | QPSK | 2 | 3/4 |
| 6.4–8.35 | 2 | 16-QAM | 4 | 1/2 |
| 8.35–10.4 | 2.5 | 16-QAM | 4 | 5/8 |
| 10.4–12.3 | 3 | 16-QAM | 4 | 3/4 |
| 12.3–14.15 | 3.5 | 64-QAM | 6 | 7/12 |
| 14.15–15.55 | 4 | 64-QAM | 6 | 2/3 |
| 15.55–17.35 | 4.5 | 64-QAM | 6 | 3/4 |
| > 17.35 | 5 | 64-QAM | 6 | 5/6 |

The modulation symbols from TX data processor 114a are provided to a TX MIMO processor 120a, which is one embodiment of TX MIMO processor 120 in FIG. 1. Within TX MIMO processor 120a, a demultiplexer 214 demultiplexes the received modulation symbols into a number of ($N_T$) modulation symbol streams, one stream for each antenna used to transmit the modulation symbols. Each modulation symbol stream is provided to a respective modulator 122. Each modulator 122 converts the modulation symbols into an analog signal, and further amplifies, filters, quadrature modulates, and upconverts the signal to generate a modulated signal suitable for transmission via an associated antenna 124 over the wireless link.

If the number of spatial subchannels is less than the number of available transmit antennas (i.e., $N_C < N_T$) then various schemes may be used for the data transmission. In one scheme, $N_C$ modulation symbol steams are generated and transmitted on a subset (i.e., $N_C$) of the available transmitted antennas. The remaining ($N_T - N_C$) transmit antennas are not used for the data transmission. In another scheme, the additional degrees of freedom provided by the ($N_T - N_C$) additional transmit antennas are used to improve the reliability of the data transmission. For this scheme, each of one or more data streams may be encoded, possibly interleaved, and transmitted over multiple transmit antennas. The use of multiple transmit antennas for a given data stream increases diversity and improves reliability against deleterious path effects.

MIMO Transmitter System with Full-CSI Processing

Figure 2B:
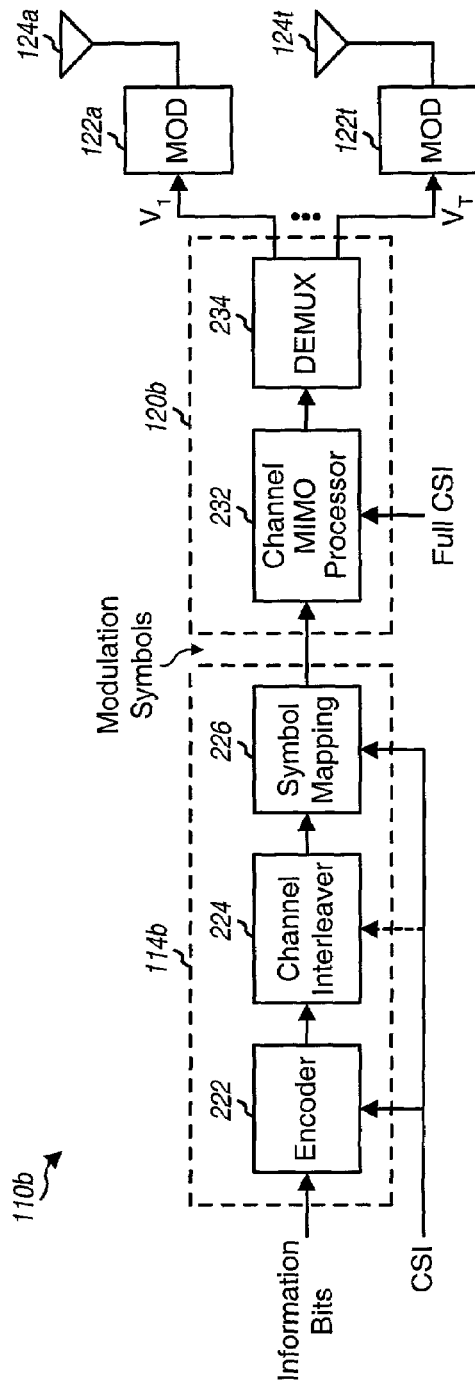

FIG. 2B is a block diagram of an embodiment of a MIMO transmitter system 110b, which does not utilize OFDM is but capable of processing data based on full CSI reported by receiver system 150. Transmitter system 110b is another embodiment of the transmitter portion of system 110 in FIG. 1 and includes a TX data processor 114b coupled to a TX MIMO processor 120b.

In the specific embodiment shown in FIG. 2B, TX data processor 114b includes an encoder 222, a channel interleaver 224, and a symbol mapping element 226. Encoder 222 receives and encodes the information bits in accordance with a particular coding scheme to provide coded bits. Channel interleaver 224 interleaves the coded bits based on a particular interleaving scheme to provide diversity. And symbol mapping element 226 maps the interleaved bits into modulation symbols for the transmission channels used for transmitting the data. As shown in FIG. 2B, the data encoding, interleaving, and modulation (or any combination thereof) may be adjusted based on the available CSI.

Pilot data may also be encoded and multiplexed with the processed information bits. The processed pilot data may be transmitted (e.g., in a TDM or CDM manner) in all or a subset of the transmission channels used to transmit the information bits.

Within TX MIMO processor 120b, a channel MIMO processor 232 demultiplexes the received modulation symbols into a number of ($N_C$) modulation symbol streams, one stream for each spatial subchannel (i.e., eigenmode) used to transmit the modulation symbols. For full-CSI processing, channel MIMO processor 232 preconditions the $N_C$ modulation symbols at each time slot to generate $N_T$ preconditioned modulation symbols, as follows:

$$\begin{bmatrix} x_1 \\ x_2 \\ \vdots \\ x_{N_T} \end{bmatrix} = \begin{bmatrix} e_{11}, & e_{12}, & e_{1N_C} \\ e_{21}, & e_{22}, & e_{2N_C} \\ & & \\ e_{N_T 1}, & e_{N_T 1}, & e_{N_T N_C}, \end{bmatrix} \cdot \begin{bmatrix} b_1 \\ b_2 \\ \vdots \\ b_{N_C} \end{bmatrix} \quad \text{Eq (1)}$$

where $b_1, b_2, \ldots$ and $b_{N_C}$ are respectively the modulation symbols for spatial subchannels $1, 2, \ldots N_C$, where each of the $N_C$ modulation symbols may be generated using, for example, M-PSK, M-QAM, or some other modulation scheme;

$e_{ij}$ are elements of an eigenvector matrix $\underline{E}$ related to the transmission characteristics from the transmit antennas to the receive antennas; and $x_1, x_2, \ldots X_{N_T}$ are the preconditioned modulation symbols, which can be expressed as:

$x_1 = b_1 \cdot e_{11} + b_2 \cdot e_{12} + \ldots + b_{N_C} \cdot e_{1N_C}$, $x_2 = b_1 \cdot e_{21} + b_2 \cdot e_{22} + \ldots + b_{N_C} \cdot e_{2N_C}$, and $x_{N_T} = b_1 \cdot e_{N_T 1} + b_2 \cdot e_{N_T 2} + \ldots + b_{N_C} \cdot e_{N_T N_C}$.

The eigenvector matrix $\underline{E}$ may be computed by the transmitter or is provided to the transmitter (e.g., by the receiver).

For full-CSI processing, each preconditioned modulation symbol, $x_i$, for a particular transmit antenna represents a linear combination of (weighted) modulation symbols for up to $N_C$ spatial subchannels. The modulation scheme employed for each of the modulation symbols is based on the effective SNR of that eigenmode and is proportional to an eigenvalue, $\lambda_i$ (described below). Each of the $N_C$ modulation symbols used to generate each preconditioned modulation symbol may be associated with a different signal constellation. For each time slot, the $N_T$ preconditioned modulation symbols generated by channel MIMO processor 232 are demultiplexed by a demultiplexer 234 and provided to $N_T$ modulators 122.

The full-CSI processing may be performed based on the available CSI and on the selected transmit antennas. The full-CSI processing may also be enabled and disabled selectively and dynamically. For example, the full-CSI processing may be enabled for a particular data transmission and disabled for some other data transmissions. The full-CSI processing may be enabled under certain conditions, for example, when the communication link has adequate SNR.

MIMO Transmitter System with OFDM

Figure 3:
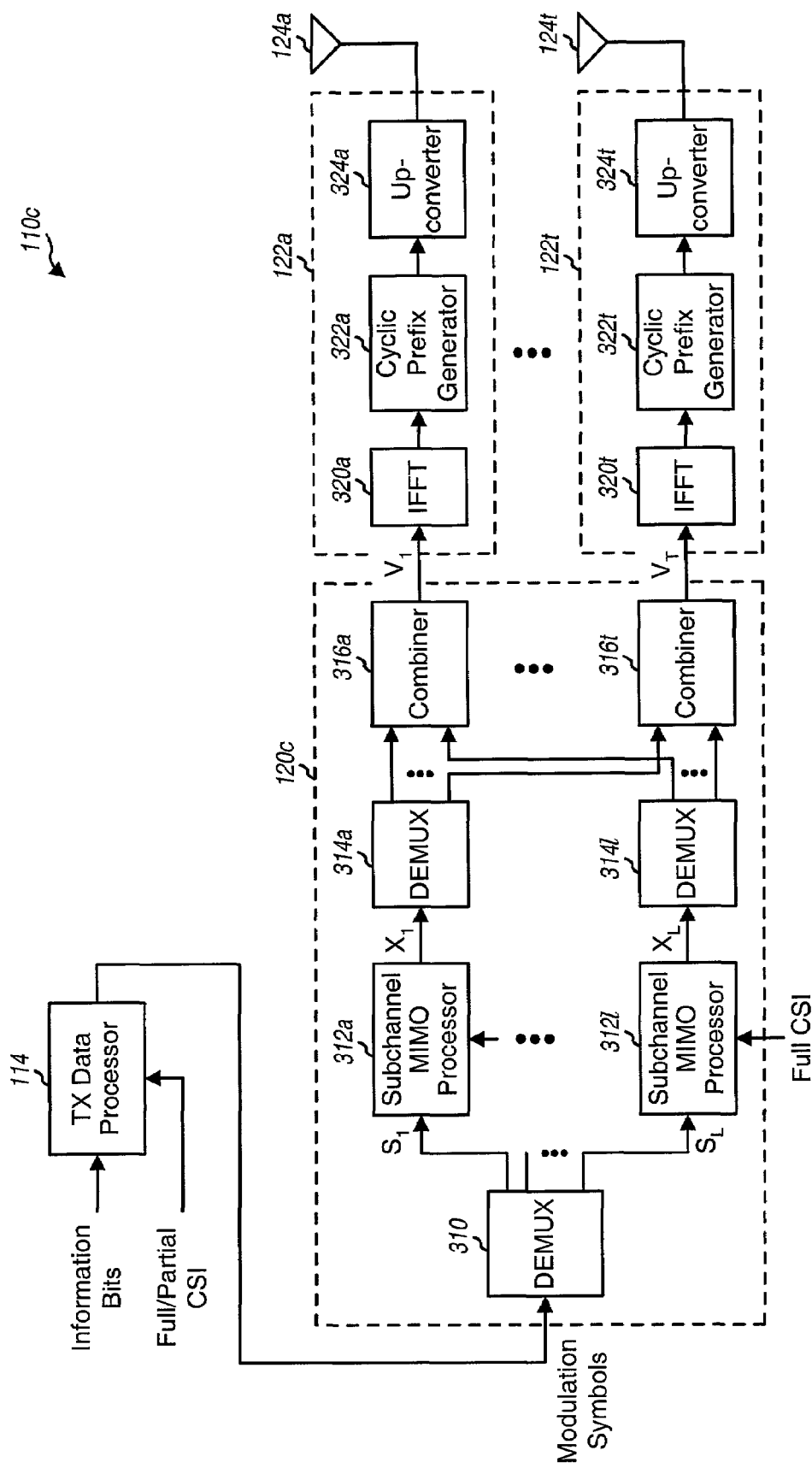
FIG. 3 is a block diagram of an embodiment of a MIMO transmitter system which utilizes orthogonal frequency division modulation (OFDM)

FIG. 3 is a block diagram of an embodiment of a MIMO transmitter system 110c, which utilizes OFDM and is capable of adjusting its processing based on full or partial CSI. The information bits are encoded, interleaved, and symbol mapped by a TX data processor 114 to generate modulation symbols. The coding and modulation may be adjusted based on the available full or partial CSI. For a MIMO system with OFDM, the modulation symbols may be transmitted on multiple frequency subchannels and from multiple transmit antennas. When operating in a pure MIMO communication mode, the transmission on each frequency subchannel and from each transmit antenna represents non-duplicated data.

Within a MIMO processor 120c, a demultiplexer (DEMUX) 310 receives and demultiplexes the modulation symbols into a number of subchannel symbol streams, $S_1$ through $S_L$, one subchannel symbol stream for each frequency subchannel used to transmit the symbols.

For full-CSI processing, each subchannel symbol stream is then provided to a respective subchannel MIMO processor 312. Each subchannel MIMO processor 312 demultiplexes the received subchannel symbol stream into a number of (up to $N_C$) symbol substreams, one symbol substream for each spatial subchannel used to transmit the modulation symbols. For full-CSI processing in an OFDM system, the eigenmodes are derived and applied on a per frequency subchannel basis. Thus, each subchannel MIMO processors 312 preconditions up to $N_C$ modulation symbols at each time slot in accordance with equation (1) to generate preconditioned modulation symbols. Each preconditioned modulation symbol for a particular transmit antenna of a particular frequency subchannel represents a linear combination of (weighted) modulation symbols for up to $N_C$ spatial subchannels.

For full-CSI processing, the (up to) $N_T$ preconditioned modulation symbols generated by each subchannel MIMO processor 312 for each time slot are demultiplexed by a respective demultiplexer 314 and provided to (up to) $N_T$ symbol combiners 316a through 316t. For example, subchannel MIMO processor 312a assigned to frequency subchannel 1 may provide up to $N_T$ preconditioned modulation symbols for frequency subchannel 1 of transmit antennas 1 through $N_T$. Similarly, subchannel MIMO processor 312l assigned to frequency subchannel $N_L$ may provide up to $N_T$ symbols for frequency subchannel $N_L$ of transmit antennas 1 through $N_T$.

For partial-CSI processing, each subchannel symbol stream, S, is demultiplexed by a respective demultiplexer 314 and provided to (up to) $N_T$ symbol combiners 316a through 316t. The processing by subchannel MIMO processor 312 is omitted for partial-CSI processing.

Each combiner 316 receives the modulation symbols for up to $N_L$ frequency subchannels, combines the symbols for each time slot into a modulation symbol vector V, and provides the modulation symbol vector to the next processing stage (i.e., modulator 122).

MIMO processor 120c thus receives and processes the modulation symbols to provide $N_T$ modulation symbol vectors, $V_1$ through $V_T$, one modulation symbol vector for each transmit antenna. Each modulation symbol vector V covers a single time slot, and each element of the modulation symbol vector V is associated with a specific frequency subchannel having a unique subcarrier on which the modulation symbol is conveyed. If not operating in a "pure" MIMO communication mode, some of the modulation symbol vectors may have duplicate or redundant information on specific frequency subchannels for different transmit antennas.

FIG. 3 also shows an embodiment of modulator 122 for OFDM. The modulation symbol vectors $V_1$ through $V_T$ from MIMO processor 120c are provided to modulators 122a through 122t, respectively. In the embodiment shown in FIG. 3, each modulator 122 includes an inverse Fast Fourier Transform (IFFT) 320, a cyclic prefix generator 322, and an upconverter 324.

IFFT 320 converts each received modulation symbol vector into its time-domain representation (which is referred to as an OFDM symbol) using IFFT. IFFT 320 can be designed to perform the IFFT on any number of frequency subchannels (e.g., 8, 16, 32, and so on). In an embodiment, for each modulation symbol vector converted to an OFDM symbol, cyclic prefix generator 322 repeats a portion of the time-domain representation of the OFDM symbol to form a transmission symbol for a specific transmit antenna. The cyclic prefix insures that the transmission symbol retains its orthogonal properties in the presence of multipath delay spread, thereby improving performance against deleterious path effects. The implementation of IFFT 320 and cyclic prefix generator 322 is known in the art and not described in detail herein.

The time-domain representations from each cyclic prefix generator 322 (i.e., the transmission symbols for each antenna) are then processed (e.g., converted into an analog signal, modulated, amplified, and filtered) by upconverter 324 to generate a modulated signal, which is then transmitted from the respective antenna 124.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

A number of different types of transmission (e.g., voice, signaling, data, pilot, and so on) may be transmitted by a communication system. Each of these transmissions may require different processing.

Figure 4:
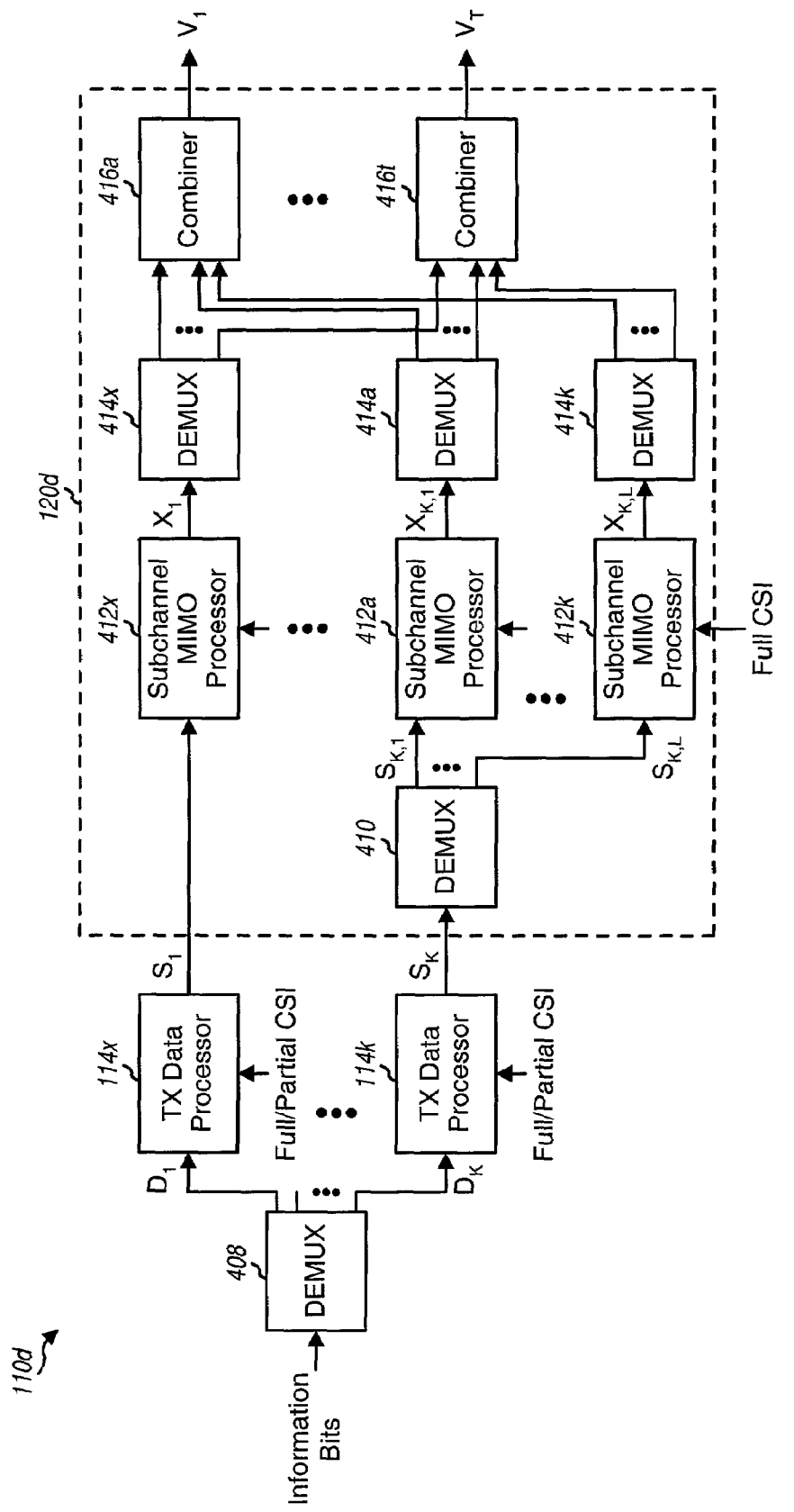
FIG. 4 is a block diagram of a portion of a MIMO transmitter system capable of providing different processing for different transmission types and which also employs OFDM.

FIG. 4 is a block diagram of a portion of a MIMO transmitter system 110d capable of providing different processing for different transmission types and which also employs OFDM. The aggregate input data, which includes all information bits to be transmitted by system 110d, is provided to a demultiplexer 408. Demultiplexer 408 demultiplexes the input data into a number of (K) data streams, $D_1$ through $D_K$. Each data stream may correspond to, for example, a signaling channel, a broadcast channel, a voice call, or a packet data transmission. Each data stream is provided to a respective TX data processor 114 that encodes the data using a particular coding scheme selected for that data stream, interleaves the encoded data based on a particular interleaving scheme, and maps the interleaved bits into modulation symbols for one or more transmission channels used for transmitting that data stream.

The encoding can be performed on a per transmission basis (e.g., on each data stream, as shown in FIG. 4). However, the encoding may also be performed on the aggregate input data (as shown in FIG. 1), on a number of data streams, on a portion of a data stream, across a set of frequency subchannels, across a set of spatial subchannels, across a set of frequency subchannels and spatial subchannels, across each frequency subchannel, on each modulation symbol, or on some other unit of time, space, and frequency.

The modulation symbol stream from each TX data processor 114 may be transmitted on one or more frequency subchannels and via one or more spatial subchannels of each frequency subchannel. A TX MIMO processor 120d receives the modulation symbol streams from TX data processors 114. Depending on the communication mode to be used for each modulation symbol stream, TX MIMO processor 120d may demultiplex the modulation symbol stream into a number of subchannel symbol streams. In the embodiment shown in FIG. 4, modulation symbol stream $S_1$ is transmitted on one frequency subchannel and modulation symbol stream $S_K$ is transmitted on $N_L$ frequency subchannels. The modulation stream for each frequency subchannel is processed by a respective subchannel MIMO processor 412, demultiplexed by a demultiplexer 414, and combined by a combiner 416 (e.g., in similar manner as that described in FIG. 3) to form a modulation symbol vector for each transmit antenna.

In general, a transmitter system codes and modulates data for each transmission channel based on information descriptive of that channel's transmission capability. This information is typically in the form of full CSI or partial CSI described above. The full/partial CSI for the transmission channels used for data transmission is typically determined at the receiver system and reported back to the transmitter system, which then uses the information to adjust the coding and modulation accordingly. The techniques described herein are applicable for multiple parallel transmission channels supported by MIMO, OFDM, or any other communication scheme (e.g., a CDMA scheme) capable of supporting multiple parallel transmission channels.

MIMO processing is described in further detail in U.S patent application Ser. No. 09/532,492, entitled "HIGH EFFICIENCY, HIGH PERFORMANCE COMMNICATIONS SYSTEM EMPLOYING MULTI-CARRIER MODULATION," filed Mar. 22, 2000, the aforementioned U.S. patent application Ser. No. 09/776,075, U.S. patent application Ser. No. 09/826,481, entitled "METHOD AND APPARATUS FOR UTILIZING CHANNEL STATE INFORMATION IN A WIRELESS COMMUNICATION SYSTEM," filed Mar. 23, 2001, and the aforementioned U.S. patent application Ser. No. 09/854,235, all assigned to the assignee of the present application and incorporated herein by reference.

MIMO Receiver System

Aspects of the invention provide techniques to process the received signals in a MIMO system to recover the transmitted data, and to estimate the characteristics of the MIMO channel. The estimated channel characteristics may then be reported back to the transmitter system and used to adjust the signal processing (e.g., coding, modulation, and so on). In this manner, high performance is achieved based on the determined channel conditions.

Different receive and (possibly) transmit processing schemes may be used depending on the characteristics of the MIMO channel, which may be characterized as either non-dispersive or dispersive. A non-dispersive MIMO channel experiences flat fading (i.e., frequency non-selective fading), which may be more likely when the system bandwidth is narrow. A dispersive MIMO channel experiences frequency non-selective fading (e.g., different amount of attenuation across the system bandwidth), which may be more likely when the system bandwidth is wide and for certain operating conditions and environments.

For a non-dispersive MIMO channel, linear spatial processing techniques such as a channel correlation matrix inversion (CCMI) technique, a minimum mean square error (MMSE) technique, and a full-CSI technique, all of which are described in further detail below, may be used to process the received signals prior to demodulation and decoding. Other receiver processing techniques may also be used and are within the scope of the invention. These linear spatial processing techniques may be employed at the receiver to null out the undesired signals, or to maximize the received SNR of each of the constituent signals in the presence of noise and interference from the other signals. The ability to effectively null undesired signals or optimize the SNRs depends upon the correlation in a channel coefficient matrix $\underline{H}$ that describes the channel response between the transmit and receive antennas.

For a dispersive MIMO channel, time dispersion in the channel introduces inter-symbol interference (ISI). To improve performance, a wideband receiver attempting to recover a particular transmitted data stream would need to ameliorate both the "crosstalk" from the other transmitted signals as well as the inter-symbol interference from all of the transmitted signals. To deal with crosstalk and inter-symbol interference, the spatial processing (which handles crosstalk well but does not effectively deal with inter-symbol interference) may be replaced with space-time processing.

In one embodiment, a MMSE linear equalizer (MMSE-LE) may be used for the space-time processing for a dispersive channel. Using the MMSE-LE technique, the space-time processing assumes similar form as the spatial processing for the non-dispersive channel. However, each "filter tap" in the spatial processor includes more than one tap, as described in further detail below. The MMSE-LE technique is most effective for use in space-time processing when the channel estimates (i.e., the channel coefficient matrix $\underline{H}$) are accurate.

In another embodiment, a decision feedback equalizer (DFE) may be used for the space-time processing. The DFE is a non-linear equalizer that is effective for channels with severe amplitude distortion and uses decision feedback to cancel interference from symbols that have already been detected. If the data stream can be decoded without errors (or with minimal errors), then the inter-symbol interference generated by the modulation symbols corresponding to the decoded data bits may be effectively canceled.

In yet another embodiment, a maximum-likelihood sequence estimator (MLSE) may be used for the space-time processing.

The DFE and MLSE techniques may reduce or possibly eliminate the degradation in performance when the channel estimates are not as accurate. The DFE and MLSE techniques are described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, July 1999, and incorporated herein by reference.

FIG. 1 shows an embodiment of receiver system 150 having multiple ($N_R$) receive antennas and capable of processing a data transmission. The transmitted signals from (up to) $N_T$ transmit antennas are received by each of $N_R$ antennas 152a through 152r and routed to a respective demodulator (DEMOD) 154 (which is also referred to as a front-end processor). For example, receive antenna 152a may receive a number of transmitted signals from a number of transmit antennas, and receive antenna 152r may similarly receive multiple transmitted signals. Each demodulator 154 conditions (e.g., filters and amplifies) a respective received signal, downconverts the conditioned signal to an intermediate frequency or baseband, and digitizes the downconverted signal to provide samples. Each demodulator 154 may further demodulate the digitized samples with a received pilot to generate a stream of received modulation symbols, which is provided to RX MIMO processor 156.

If OFDM is employed for the data transmission, each demodulator 154 further performs processing complementary to that performed by modulator 122 shown in FIG. 3. In this case, each demodulator 154 includes an FFT processor (not shown) that generates transformed representations of the samples and provides a stream of modulation symbol vectors, with one vector being provided for each time slot and each vector including $N_L$ modulation symbols for $N_L$ frequency subchannels. The modulation symbol vector streams from the FFT processors of all $N_R$ demodulators are then provided to a demultiplexer/combiner (not shown in FIG. 1), which first "channelizes" the modulation symbol vector stream from each FFT processor into a number of (up to $N_L$) modulation symbol streams. For a transmit processing scheme in which each frequency subchannel is independently processed, each of the (up to) $N_L$ modulation symbol streams may be provided to a respective RX MIMO processor 156.

For a MIMO system not utilizing OFDM, one RX MIMO processor 156 may be used to perform the MIMO processing for the modulation symbols from the $N_R$ received antennas. And for a MIMO system utilizing OFDM, one RX MIMO processor 156 may be used to perform the MIMO processing for the modulation symbols from the $N_R$ received antennas for each of the $N_L$ frequency subchannels used for data transmission. Alternatively, one RX MIMO processor 156 may be used to perform the MIMO processing for the modulation symbols for the $N_L$ frequency subchannels, e.g., in a time multiplexed manner.

Spatial Processing Techniques for Non-Dispersive Channels

As noted above, a number of linear spatial processing techniques may be used to process the signals received via a non-dispersive channel to recover each transmitted signal stream. These techniques include the CCMI, MMSE, and possibly other techniques.

In a MIMO system with $N_T$ transmit antennas and $N_R$ receive antennas, the received signals at the output of the $N_R$ receive antennas may be expressed as:

$$\underline{r} = \underline{H}\underline{x} + \underline{n}, \qquad \text{Eq (2)}$$

where $\underline{r}$ is the received symbol vector (i.e., the $N_R \times 1$ vector output from the MIMO channel, as measured at the receive antennas), $\underline{H}$ is the $N_R \times N_T$ channel coefficient matrix that gives the channel response for the $N_T$ transmit antennas and $N_R$ receive antennas at a specific time, $\underline{x}$ is the transmitted symbol vector (i.e., the $N_T \times 1$ vector input into the MIMO channel), and $\underline{n}$ is an $N_R \times 1$ vector representing noise plus interference. The received symbol vector $\underline{r}$ includes $N_R$ modulation symbols from $N_R$ signals received via $N_R$ receive antennas at a specific time. Similarly, the transmitted symbol vector $\underline{x}$ includes $N_T$ modulation symbols in $N_T$ signals transmitted via $N_T$ transmit antennas at a specific time slot.

CCMI Technique

For the CCMI spatial processing technique, the receiver system first performs a channel matched filter operation on the received symbol vector $\underline{r}$. The filtered output can be expressed as:

$$\underline{H}^H\underline{r} = \underline{H}^H\underline{H}\underline{x} + \underline{H}^H\underline{n} \quad \text{Eq (3)}$$

where the superscript "$H$" represents transpose and complex conjugate. A square matrix $\underline{R}$ may be used to denote the product of the channel coefficient matrix $\underline{H}$ with its conjugate-transpose $\underline{H}^H$ (i.e., $\underline{R} = \underline{H}^H\underline{H}$).

The channel coefficient matrix $\underline{H}$ may be derived, for example, from pilot symbols transmitted along with the data. In order to perform "optimal" reception and to estimate the SNR of the transmission channels, it is often convenient to insert pilot data of some known symbols (e.g., a sequence of all ones) into the transmit data stream and to transmit the pilot data over one or more transmission channels. Methods for estimating a single transmission channel based on a pilot signal and/or a data transmission may be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, October 1999. This or some other channel estimation method may be extended to matrix form to derive the channel coefficient matrix $\underline{H}$.

An estimate of the transmitted symbol vector, $\underline{x}'$, may be obtained by multiplying the match filtered vector $\underline{H}^H\underline{r}$ with the inverse (or pseudo-inverse) of $\underline{R}$, which can be expressed as:

$$\begin{aligned}\underline{x}' &= \underline{R}^{-1}\underline{H}^H\underline{r} \\ &= \underline{x} + \underline{R}^{-1}\underline{H}^H\underline{n} \\ &= \underline{x} + \underline{n}'.\end{aligned} \quad \text{Eq (4)}$$

From the above equations, it can be observed that the transmitted symbol vector $\underline{x}$ may be recovered by matched filtering (i.e., multiplying with the matrix $\underline{H}^H$) the received symbol vector $\underline{r}$ and then multiplying the filtered result with the inverse square matrix $\underline{R}^{-1}$.

The SNR of the transmission channels may be determined as follows. The autocorrelation matrix $\underline{\phi}_{nn}$ of the noise vector $\underline{n}$ is first computed from the received signal. In general, $\underline{\phi}_{nn}$ is a Hermitian matrix, i.e., it is complex-conjugate-symmetric. If the components of the channel noise are uncorrelated and further independent and identically distributed (iid), the autocorrelation matrix $\underline{\phi}_{nn}$ of the noise vector $\underline{n}$ can be expressed as:

$$\underline{\phi}_{nn} = \sigma_n^2 \underline{I}, \text{ and} \quad \text{Eq (5)}$$

$$\underline{\phi}_{nn}^{-1} = \frac{1}{\sigma_n^2}\underline{I},$$

where $\underline{I}$ is the identity matrix (i.e., ones along the diagonal and zeros otherwise) and $\sigma_n^2$ is the noise variance of the received signals. The autocorrelation matrix $\underline{\phi}_{n'n'}$ of the post-processed noise vector $\underline{n}'$ (i.e., after the matched filtering and pre-multiplication with the matrix $\underline{R}^{-1}$) can be expressed as:

$$\begin{aligned}\underline{\phi}_{n'n'} &= E[\underline{n}'\underline{n}'^H] \\ &= \sigma_n^2\underline{R}^{-1}\end{aligned} \quad \text{Eq (6)}$$

From equation (6), the noise variance $\sigma_{n'}^2$ of the i-th element of the post-processed noise $\underline{n}'$ is equal to $\sigma_n^2 \breve{r}_{ii}$, where $\breve{r}_{ii}$ is the i-th diagonal element of $\underline{R}^{-1}$. For a MIMO system not utilizing OFDM, the i-th element is representative of the i-th receive antenna. And if OFDM is utilized, then the subscript "i" may be decomposed into a subscript "jk", where "j" represents the j-th frequency subchannel and "k" represents the k-th spatial subchannel corresponding to the k-th receive antenna.

For the CCMI technique, the SNR of the i-th element of the received symbol vector after processing (i.e., the i-th element of $\underline{x}'$) can be expressed as:

$$SNR_i = \frac{\overline{|x_i'|^2}}{\sigma_{n'}^2}. \quad \text{Eq (7)}$$

If the variance of the i-th transmitted symbol $\overline{|x_i'|^2}$ is equal to one (1.0) on the average, the SNR of the receive symbol vector may be expressed as:

$$SNR_i = \frac{1}{\breve{r}_{ii}\sigma_n^2}.$$

The noise variance may be normalized by scaling the i-th element of the received symbol vector by $1/\sqrt{\breve{r}_{ii}}$.

If a modulation symbol stream was duplicated and transmitted over multiple transmit antennas, then these modulation symbols may be summed together to form combined modulation symbols. For example, if a data stream was transmitted from all antennas, then the modulation symbols corresponding to all $N_T$ transmit antennas are summed, and the combined modulation symbol may be expressed as:

$$x'_{total} = \sum_{i=1}^{N_T} \frac{x_i'}{\breve{r}_{ii}}. \quad \text{Eq (8)}$$

Alternatively, the transmitter may be operated to transmit one or more data streams on a number of transmission channels using the same coding and modulation scheme on some or all transmit antennas. In this case, only one SNR (e.g., an average SNR) may be needed for all transmission channels for which the common coding and modulation scheme is applied. For example, if the same coding and modulation scheme is applied on all transmit antennas, then the SNR of the combined modulation symbol, $SNR_{total}$, can be derived. This $SNR_{total}$ would then have a maximal combined SNR that is equal to the sum of the SNRs of the signals from the $N_R$ receive antennas. The combined SNR may be expressed as:

$$SNR_{total} = \sum_{i=1}^{N_T} SNR_i = \frac{1}{\sigma_n^2} \sum_{i=1}^{N_T} \frac{1}{r_{ii}}.\qquad \text{Eq (9)}$$

Figure 5:
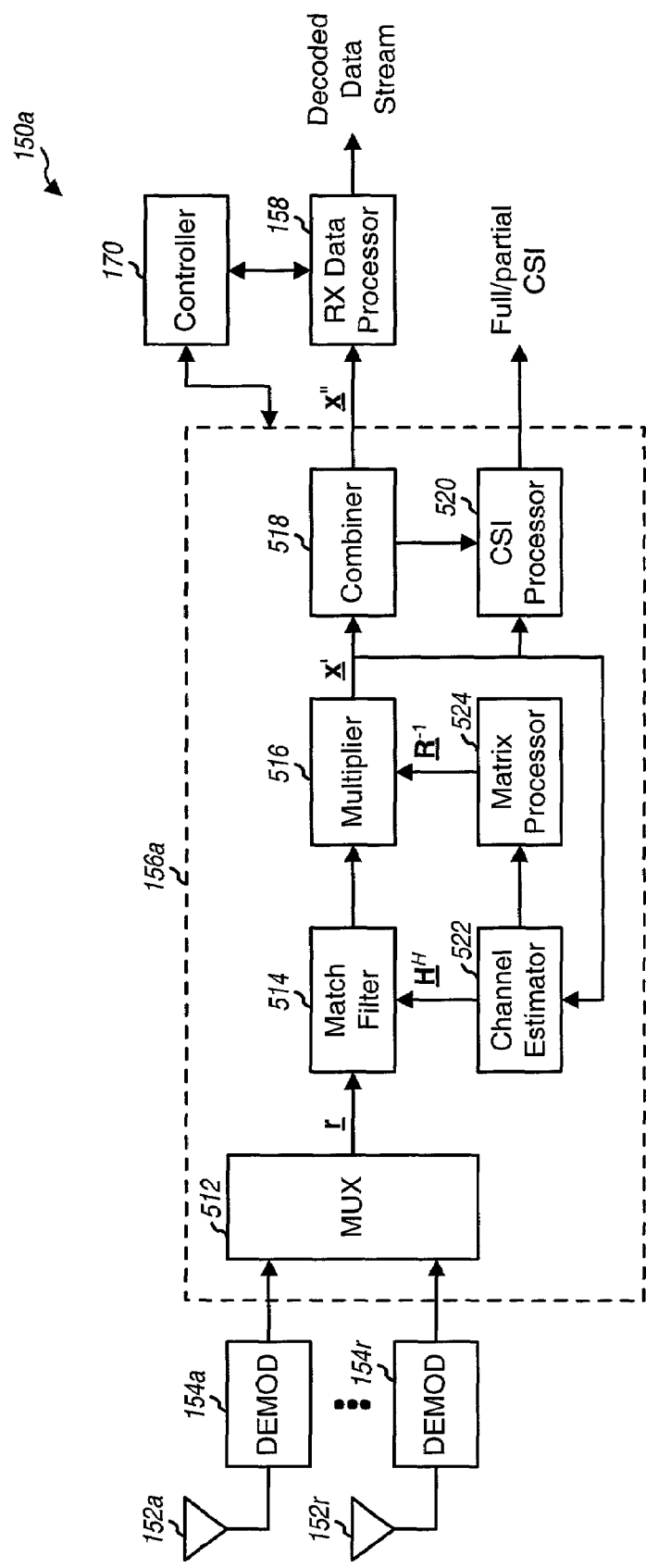
FIGS. 5, 6, and 7 are block diagrams of three embodiments of a receiver system having multiple ($N_R$) receive antennas and capable of processing a data transmission based on a channel correlation matrix inversion (CCMI) technique, a minimum mean square error (MMSE) technique, and a decision feedback equalizer (DFE) technique, respectively.

FIG. 5 is a block diagram of an embodiment of an RX MIMO processor 156a, which is capable of implementing the CCMI processing described above. Within RX MIMO processor 156a, the modulation symbols from the $N_R$ receive antennas are multiplexed by a multiplexer 512 to form a stream of received modulation symbol vectors $\underline{r}$. The channel coefficient matrix $\underline{H}$ may be estimated based on pilot signals similar to conventional pilot assisted single and multi-carrier systems, as is known in the art. The matrix $\underline{R}$ is then computed according to $\underline{R} = \underline{H}^H \underline{H}$ as described above. The received modulation symbol vectors $\underline{r}$ are then filtered by a match filter 514, which pre-multiplies each vector $\underline{r}$ with the conjugate-transpose channel coefficient matrix $\underline{H}^H$, as shown above in equation (3). The filtered vectors are further pre-multiplied by a multiplier 516 with the inverse square matrix $\underline{R}^{-1}$ to form an estimate $\underline{x}'$ of the transmitted modulation symbol vector $\underline{x}$, as shown above in equation (4).

For certain transmit processing schemes, the symbol streams from all antennas used for the transmission of a data stream may be provided to a combiner 518, which combines redundant information across time, space, and frequency. The combined modulation symbols $\underline{x}''$ are then provided to RX data processor 158. For some other communication modes, the estimated modulation symbols $\underline{x}'$ may be provided directly to RX data processor 158 (not shown in FIG. 5).

RX MIMO processor 156a thus generates a number of independent symbol streams corresponding to the number of transmission channels (or data streams) used at the transmitter system. Each symbol stream includes post-processed modulation symbols, which correspond to and are estimates of the modulation symbols prior to the full/partial-CSI processing at the transmitter system. The (post-processed) symbol streams are then provided to RX data processor 158.

Within RX data processor 158, each stream of post-processed modulation symbols is provided to a respective demodulation element that implements a demodulation scheme (e.g., M-PSK, M-QAM) that is complementary to the modulation scheme used at the transmitter system for the transmission channel being processed. Depending on the coding and modulation method employed at the transmitter unit, the demodulated data from all assigned demodulators may be decoded independently, or may be multiplexed into one or more data streams, each of which may be decoded separately. Each data stream may then be provided to a respective decoder that implements a decoding scheme complementary to that used at the transmitter unit for the data stream. The decoded data from each decoder represents an estimate of the transmitted data for that data stream.

The estimated modulation symbols $\underline{x}'$ and/or the combined modulation symbols $\underline{x}''$ are also provided to a CSI processor 520, which determines full or partial CSI for the transmission channels and provides the full/partial CSI to be reported back to transmitter system 110. For example, CSI processor 520 may estimate the noise covariance matrix $\underline{\phi}_{nn}$ of the i-th transmission channel based on the received pilot signal and then compute the SNR based on equations (7) and (9). The SNR can be estimated similar to conventional pilot assisted single and multi-carrier systems, as is known in the art. The SNR for the transmission channels comprises the partial CSI that is reported back to the transmitter system. The modulation symbols are further provided to a channel estimator 522 and a matrix processor 524 that respectively estimates the channel coefficient matrix $\underline{H}$ and derives the square matrix $\underline{R}$. The estimated modulation symbols corresponding to pilot data and/or traffic data may also be used to estimate the channel coefficient matrix $\underline{H}$. A controller 170 couples to RX MIMO processor 156a and RX data processor 158 and directs the operation of these units.

Figure 8:
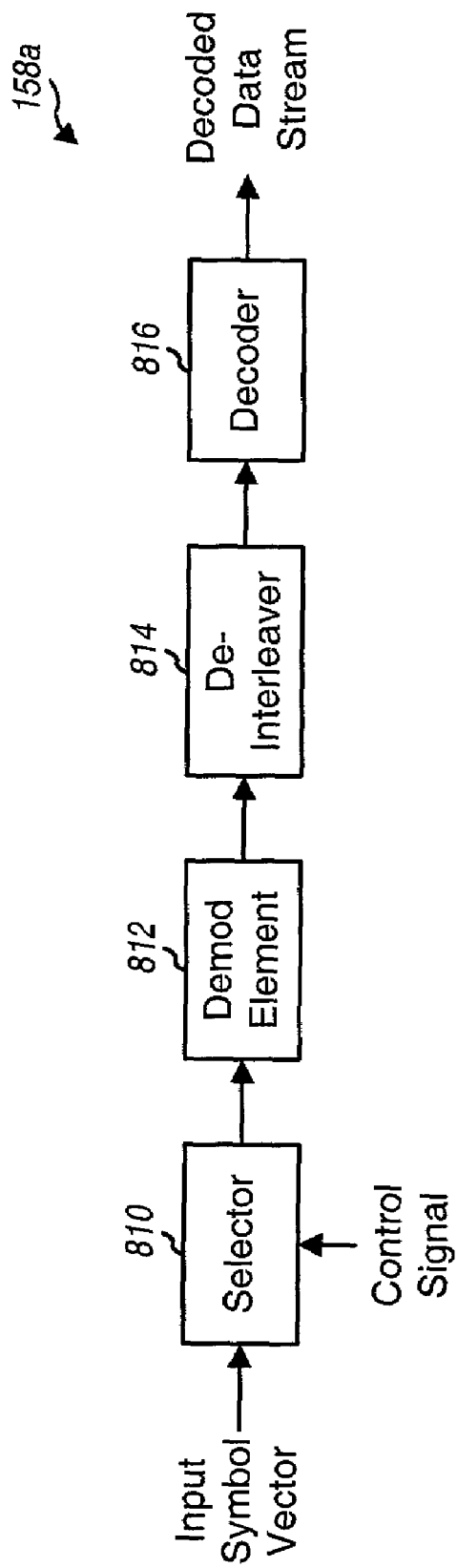
FIG. 8 is a block diagram of an embodiment of a receive (RX) data processor.

FIG. 8 is a block diagram of an embodiment of a RX data processor 158a. In this embodiment, a selector 810 within RX data processor 158a receives a number of symbol streams from a preceding linear spatial (or space-time) processor and extracts the modulation symbols corresponding to the desired data stream to be recovered. In an alternative embodiment, RX data processor 158a is provided with a modulation symbol stream corresponding to the desired data stream and the modulation symbol extraction may be performed by combiner 518. In any case, the stream of extracted modulation symbols is provided to a demodulation element 812.

For a transmitter embodiment in which the data stream for each transmission channel is independently coded and modulated (e.g., based on the channel's SNR), the recovered modulation symbols for the selected transmission channel are demodulated in accordance with a demodulation scheme (e.g., M-PSK, M-QAM) that is complementary to the modulation scheme used for the transmission channel. The demodulated data from demodulation element 812 is then de-interleaved by a de-interleaver 814 in a complementary manner to that performed at the transmitter, and the de-interleaved data is further decoded by a decoder 816 in a complementary manner to that performed at the transmitter. For example, a Turbo decoder or a Viterbi decoder may be used for decoder 816 if Turbo or convolutional coding, respectively, is performed at the transmitter. The decoded data stream from decoder 816 represents an estimate of the transmitted data stream being recovered.

MMSE Technique

For the MMSE technique, the receiver system performs a multiplication of the received symbol vector $\underline{r}$ with a matrix $\underline{M}$ to derive an initial MMSE estimate $\hat{\underline{x}}$ of the transmitted symbol vector $\underline{x}$, which can be expressed as:

$$\hat{\underline{x}} = \underline{M}\underline{r}. \qquad \text{Eq (10)}$$

The matrix $\underline{M}$ is selected such that the mean square error of the error vector $\underline{e}$ between the initial MMSE estimate $\hat{\underline{x}}$ and the transmitted symbol vector $\underline{x}$ (i.e., $\underline{e} = \hat{\underline{x}} - \underline{x}$) is minimized.

To determine $\underline{M}$, a cost function $\epsilon$ can first be expressed as:

$$\begin{aligned}\varepsilon &= E\{\underline{e}^H \underline{e}\} \\ &= E\{[\underline{r}^H \underline{M}^H - \underline{x}^H][\underline{M}\underline{r} - \underline{x}]\} \\ &= E\{\underline{r}^H \underline{M}^H \underline{M}\underline{r} - 2\text{Re}[\underline{x}^H \underline{M}\underline{r}] + \underline{x}^H \underline{x}\}.\end{aligned}$$

To minimize the cost function $\epsilon$, a derivative of the cost function can be taken with respect to $\underline{M}$, and the result can be set to zero, as follows:

$$\frac{\partial}{\partial \underline{M}} \varepsilon = 2(\underline{HH}^H + \underline{\phi}_{nn})\underline{M}^H - 2\underline{H} = 0.$$

Using the equalities $E\{\underline{xx}^H\}=\underline{I}$, $E\{\underline{rr}^H\}=\underline{HH}^H+\underline{\phi}_{nn}$, and $E\{\underline{rx}^H\}=\underline{H}$, the following is obtained:

$$2(\underline{HH}^H+\underline{\phi}_{nn})\underline{M}^H = 2\underline{H}.$$

Thus, the matrix $\underline{M}$ can be expressed as:

$$\underline{M}=\underline{H}^H(\underline{HH}^H+\underline{\phi}_{nn})^{-1}. \qquad \text{Eq (11)}$$

Based on equations (10) and (11), the initial MMSE estimate $\hat{x}$ of the transmitted symbol vector $\underline{x}$ can be determined as:

$$\begin{aligned}\hat{\underline{x}} &= \underline{Mr} \\ &= \underline{H}^H(\underline{HH}^H+\underline{\phi}_{nn})^{-1}\underline{r}.\end{aligned} \qquad \text{Eq (12)}$$

To determine the SNR of the transmission channels for the MMSE technique, the signal component can first be determined based on the mean of $\hat{x}$ given $\underline{x}$, averaged over the additive noise, which can be expressed as:

$$\begin{aligned}E[\hat{\underline{x}} \mid \underline{x}] &= E[\underline{Mr} \mid \underline{x}] \\ &= \underline{H}^H(\underline{HH}^H+\underline{\phi}_{nn})^{-1}E[\underline{r}] \\ &= \underline{H}^H(\underline{HH}^H+\underline{\phi}_{nn})^{-1}\underline{Hx} \\ &= \underline{Vx},\end{aligned}$$

where the matrix $\underline{V}$ is defined as:

$$\begin{aligned}\underline{V} &= \{v_{ij}\} \\ &= \underline{MH} \\ &= \underline{H}^H(\underline{HH}^H+\underline{\phi}_{nn})^{-1}\underline{H}.\end{aligned}$$

Using the identity $$(\underline{HH}^H+\underline{\phi}_{nn})^{-1}=\underline{\phi}_{nn}^{-1}-\underline{\phi}_{nn}^{-1}\underline{H}(\underline{I}+\underline{H}^H\underline{\phi}_{nn}^{-1}\underline{H})^{-1}\underline{H}^H\underline{\phi}_{nn}^{-1},$$

the matrix $\underline{V}$ can be expressed as:

$$\underline{V}=\underline{H}^H\underline{\phi}_{nn}^{-1}\underline{H}(\underline{I}+\underline{H}^H\underline{\phi}_{nn}^{-1}\underline{H})^{-1}.$$

The i-th element of the initial MMSE estimate $\hat{x}$, $\hat{x}_i$, can be expressed as:

$$\hat{x}_i = v_{i1}x_1 + \ldots + v_{ii}x_i + \ldots + v_{iN_R}x_{N_R}. \qquad (13)$$

If all of the elements of $\hat{x}$ are uncorrelated and have zero mean, the expected value of the ith element of $\hat{x}$ can be expressed as:

$$E[\hat{x}_i \mid \underline{x}] = v_{ii}x_i. \qquad (14)$$

As shown in equation (14), $\hat{x}_i$ is a biased estimate of $x_i$. This bias can be removed to obtain improved receiver performance. An unbiased estimate of $x_i$ can be obtained by dividing $\hat{x}_i$ by $v_{ii}$. Thus, the unbiased minimum mean square error estimate of $\underline{x}$, $\tilde{x}$, can be obtained by pre-multiplying the biased estimate $\hat{x}$ by a diagonal matrix $\underline{D}_v^{-1}$, as follows:

$$\tilde{\underline{x}}=\underline{D}_v^{-1}\hat{\underline{x}}, \qquad \text{Eq (15)}$$

where $$\underline{D}_v^{-1}=\text{diag}(1/v_{11}, 1/v_{22}, \ldots, 1/v_{N_RN_R}),$$

and $v_{ii}$ are the diagonal elements of the matrix $\underline{V}$. To determine the noise plus interference, the error $\hat{e}$ between the unbiased estimate $\tilde{x}$ and the transmitted symbol vector $\underline{x}$ can be expressed as:

$$\begin{aligned}\hat{\underline{e}} &= \underline{x} - \underline{D}_v^{-1}\hat{\underline{x}} \\ &= \underline{x} - \underline{D}_v^{-1}\underline{H}^H(\underline{HH}^H+\underline{\phi}_{nn})^{-1}\underline{r}.\end{aligned}$$

The autocorrelation matrix of the error vector $\hat{e}$ can be expressed as:

$$\begin{aligned}\underline{\phi}_{\hat{e}\hat{e}} &\cong \underline{U} \cong \{u_{ij}\} = E[(\hat{\underline{e}}\hat{\underline{e}})^H] \\ &= \underline{I} - \underline{D}_v^{-1}\underline{H}^H(\underline{HH}^H+\underline{\phi}_{nn})^{-1}\underline{H}\left(1-\frac{1}{2}\underline{D}_v^{-1}\right) - \\ &\quad \left(1-\frac{1}{2}\underline{D}_v^{-1}\right)\underline{H}^H(\underline{HH}^H+\underline{\phi}_{nn})^{-1}\underline{H}\underline{D}_v^{-1}.\end{aligned}$$

The variance of the i-th element of the error vector $\hat{e}$ is equal to $u_{ii}$. The elements of the error vector $\hat{e}$ are correlated. However, sufficient interleaving may be used such that the correlation between the elements of the error vector $\hat{e}$ can be ignored and only the variance affects system performance.

The SNR of the received symbol vector after processing (i.e., the i-th element of $\tilde{x}$) can be expressed as:

$$SNR_i = \frac{E[\overline{|x_i|^2}]}{u_{ii}}. \qquad \text{Eq (16)}$$

where $u_{ii}$ is the variance of the i-th element of the error vector $\hat{e}$, and a matrix $\underline{U}$ can be expressed as:

$$\underline{U}=\underline{I}-\underline{D}_v^{-1}\underline{V}-\underline{V}\underline{D}_v^{-1}+\underline{D}_v^{-1}\underline{V}\underline{D}_v^{-1}. \qquad \text{Eq (17)}$$

If the variance, $\overline{|x_i|^2}$, of the i-th transmitted symbol, $x_i$, is equal to one (1.0) on the average, and from equation (16)

$$u_{ii} = \frac{1}{v_{ii}} - 1,$$

the SNR of for the receive symbol vector may be expressed as:

$$SNR_i = \frac{v_{ii}}{1-v_{ii}}. \qquad \text{Eq (18)}$$

The estimated modulation symbols, $\tilde{x}$, may similarly be combined to obtain combined modulation symbols, as described above for the CCMI technique.

Figure 6:
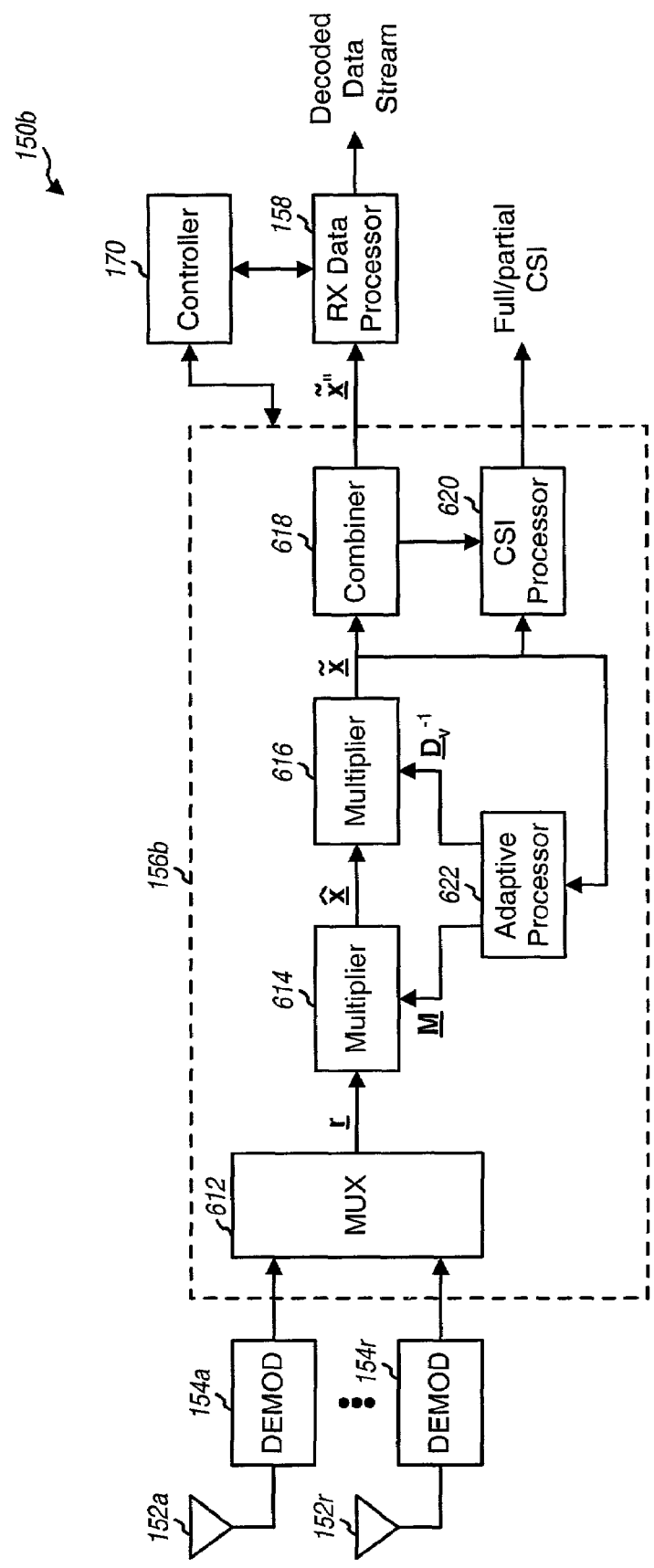

FIG. 6 shows an embodiment of an RX MIMO processor 156b, which is capable of implementing the MMSE processing described above. Similar to the CCMI technique, the matrices $\underline{H}$ and $\underline{\phi}_{nn}$ may be first estimated based on the received pilot signals and/or data transmissions. The weighting coefficient matrix $\underline{M}$ is then computed according to equation (11). Within RX MIMO processor 156b, the modulation symbols from the $N_R$ receive antennas are multiplexed by a multiplexer 612 to form a stream of received modulation symbol vectors $\underline{r}$. The received modulation symbol vectors $\underline{r}$ are then pre-multiplied by a multiplier 614 with the matrix $\underline{M}$ to form an estimate $\hat{x}$ of the transmitted symbol vector $\underline{x}$, as shown above in equation (10). The estimate $\hat{x}$ is further pre-multiplied by a multiplier 618 with the diagonal matrix $\underline{D}_v^{-1}$ to form an unbiased estimate $\tilde{x}$ of the transmitted symbol vector $\underline{x}$, as shown above in equation (15).

Again, for certain transmit processing schemes, a number of streams of estimated modulation symbols $\tilde{x}$ corresponding to a number of transmit antennas used for transmitting a data stream may be provided to a combiner 618, which combines redundant information across time, space, and frequency. The combined modulation symbols $\tilde{x}''$ are then provided to RX data processor 158. And for some other transmit processing schemes, the estimated modulation symbols $\tilde{x}$ may be provided directly to RX data processor 158. RX data processor 158 demodulates, de-interleaves, and decodes the modulation symbol stream corresponding to the data stream being recovered, as described above.

The estimated modulation symbols $\tilde{x}$ and/or the combined modulation symbols $\tilde{x}''$ are also provided to a CSI processor 620, which determines full or partial CSI for the transmission channels and provides the full/partial CSI to be reported back to transmitter system 110. For example, CSI processor 620 may estimate the SNR of the i-th transmitted signal according to equations (16) through (18). The SNRs for the transmitted signals comprise the partial CSI that is reported back to the transmitter system.

The estimated modulation symbols $\tilde{x}$ are further provided to an adaptive processor 622 that derives the matrix $\underline{M}$ and the diagonal matrix $\underline{D}_v^{-1}$ based on equation (11) and (15), respectively.

Space-Time Processing Techniques for Time-Dispersive Channels

As noted above, a number of space-time processing techniques may be used 25 to process the signals received via a time-dispersive channel. These techniques include the use of time domain channel equalization techniques such as MMSE-LE, DFE, MLSE, and possibly other techniques, in conjunction with the spatial processing techniques described above for a non-dispersive channel. The space-time processing is performed within RX MIMO processor 156 on the $N_R$ input signals.

MMSE-LE Technique

In the presence of time dispersion, the channel coefficient matrix $\underline{H}$ takes on a delay dimension, and each element of the matrix $\underline{H}$ behaves as a linear transfer function instead of a coefficient. In this case, the channel coefficient matrix $\underline{H}$ can be written in the form of a channel transfer function matrix $\underline{H}(\tau)$, which can be expressed as:

$$\underline{H}(\tau)=\{h_{ij}(\tau)\} \text{ for } 1\leq i\leq N_R, \text{ and } 1\leq j\leq N_T, \quad \text{Eq (19)}$$

where $h_{ij}(\tau)$ is the linear transfer function from the j-th transmit antenna to the i-th receive antenna. As a result of the linear transfer functions $h_{ij}(\tau)$, the received signal vector $\underline{r}(t)$ is a convolution of the channel transfer function matrix $\underline{H}(\tau)$ with the transmitted signal vector $\underline{x}(t)$, which can be expressed as:

$$\underline{r}(t)=\int \underline{H}(\tau)\underline{x}(t-\tau)d\tau. \quad (20)$$

As part of the demodulation function (performed by demodulators 154 in FIG. 5), the received signals are sampled to provide received samples. Without loss of generality, the time-dispersive channel and the received signals can be represented in a discrete-time representation in the following description. First, the channel transfer function vector $\underline{h}_j(k)$ associated with the j-th transmit antenna at delay k can be expressed as:

$$\underline{h}_j(k)=[h_{1j}(k)h_{2j}(k) \ldots h_{N_Rj}(k)]^T \text{ for } 0\leq k\leq L, \quad (21)$$

where $h_{ij}(k)$ is the k-th tap weight of the channel transfer function associated with the path between the j-th transmit antenna and the i-th receive antenna, and L is the maximum extent (in sample intervals) of the channel time dispersion. Next, the $N_R \times N_T$ channel transfer function matrix at delay k can be expressed as:

$$\underline{H}(k)=[\underline{h}_1(k)\underline{h}_2(k) \ldots \underline{h}_{N_T}(k)] \text{ for } 0\leq k\leq L. \quad \text{Eq (22)}$$

The received signal vector $\underline{r}(n)$ at sample time n can then be expressed as:

$$\underline{r}(n) = \sum_{k=0}^{L} \underline{H}(k)\underline{x}(n-k) + \underline{n}(n) = \underline{H}\underline{x}(n) + \underline{n}(n), \quad \text{Eq (23)}$$

where $\underline{H}$ is an $N_R \times (L+1)N_T$ block-structured matrix that represents the sampled channel matrix transfer function, $\underline{H}(k)$, and can be represented as:

$$\underline{H}=[\underline{H}(0)\underline{H}(1) \ldots \underline{H}(L)],$$

and $\underline{x}(n)$ is a sequence of L+1 vectors of received samples captured for L+1 sample intervals, with each vector comprising $N_R$ samples for the $N_R$ received antennas, and can be represented as:

$$\underline{x}(n) = \begin{bmatrix} x(n) \\ x(n-1) \\ \vdots \\ x(n-L) \end{bmatrix}.$$

An MMSE linear space-time processor computes an estimate of the transmitted symbol vector, $\hat{x}(n)$, at time n by performing a convolution of the sequence of received signal vectors $\underline{r}(n)$ with the sequence of 2K+1, $N_R \times N_T$ weight matrices $\underline{M}(k)$, as follows:

$$\hat{x}(n) = \sum_{k=-K}^{K} \underline{M}(k)\underline{r}(n-k) = \underline{M}\underline{r}(n), \quad \text{Eq (24)}$$

where $\underline{M}=[\underline{M}(-K) \ldots \underline{M}(0) \ldots \underline{M}(K)]$, K is a parameter that determines the delay-extent of the equalizer filter, and $$\underline{r}(n) = \begin{bmatrix} \underline{r}(n+K) \\ \vdots \\ \underline{r}(n) \\ \vdots \\ \underline{r}(n-K) \end{bmatrix}.$$

The sequence of weight matrices $\underline{M}(k)$ is selected to minimize the mean-square error, which can be expressed as:

$$\epsilon = E\{\underline{e}^H(k)\underline{e}(k)\}, \quad \text{Eq (25)}$$

where the error $\underline{e}(k)$ can be expressed as:

$$\underline{e}(k) = \hat{\underline{x}}(k) - \underline{x}(k). \quad \text{Eq (26)}$$

The MMSE solution can then be stated as the sequence of weight matrices $\underline{M}(k)$ that satisfy the linear constraints:

$$\sum_{k=-K}^{K} \underline{M}(k)\underline{R}(k-\ell) = \begin{cases} 0, & -K \le \ell < -L \\ \underline{H}^H(-\ell) & -L \le \ell \le 0 \\ 0, & 0 < \ell \le K \end{cases} \quad \text{Eq (27)}$$

where $\underline{R}(k)$ is a sequence of $N_R \times N_R$ space-time correlation matrices, which can be expressed as:

$$\underline{R}(k) = E\{\underline{r}(n-k)\underline{r}^H(n)\} = \quad \text{Eq (28)}$$

$$\begin{cases} \sum_{m=\max(0,-k)}^{\min(L,L-k)} \underline{H}(m)\underline{H}^H(m+k) + \underline{\varphi}_{nn}(k), & -L \le k \le L \\ \underline{\varphi}_{zz}(k), & \text{otherwise} \end{cases}$$

where $\underline{\varphi}_{nn}(k)$ is the noise autocorrelation function, which can be expressed as:

$$\underline{\varphi}_{nn}(k) = E\{\underline{n}(l-k)\underline{n}^H(l)\}. \quad \text{Eq (29)}$$

For white (temporally uncorrelated) noise, $\underline{\varphi}_{nn}(k) = \underline{\varphi}_{nn}\delta(k)$, where $\underline{\varphi}_{nn}$ in this case represents only the spatial correlation matrix. For spatially and temporally uncorrelated noise with equal power at each receive antenna, $\underline{\varphi}_{nn}(k) = \sigma^2 \underline{I}\delta(k)$.

Equation (27) can further be represented as:

$$\underline{M}\underline{R} = \tilde{\underline{H}}^H, \text{ or } \underline{M} = \tilde{\underline{H}}^H \underline{R}^{-1}, \quad \text{Eq (30)}$$

where $\underline{R}$ is block-Toeplitz with block j, k given by $\underline{R}(j-k)$ and $$\tilde{\underline{H}} = \begin{bmatrix} \underline{0}_{(K-L)N_R \times N_T} \\ \underline{H}(L) \\ \underline{H}(L-1) \\ \vdots \\ \underline{H}(0) \\ \underline{0}_{K,N_R \times N_T} \end{bmatrix},$$

where $\underline{0}_{m \times n}$ is an m×n matrix of zeros.

As with the MMSE spatial processing described above, to determine the SNR associated with the symbol estimates, an unbiased minimum mean square error estimate is derived. First, for the MMSE-LE estimate derived above, $$E[\hat{\underline{x}}(n) \mid \underline{x}(n)] = \underline{M}E[\underline{r}(n) \mid \underline{x}(n)] \quad \text{Eq (31)}$$

$$= [\underline{M}(-K)\underline{H}\underline{x}(n+K) + \ldots + \underline{M}(0)\underline{H}\underline{x}(n) + \ldots + \underline{M}(K)\underline{H}\underline{x}(n-K)],$$

where the expectation is taken over the noise. If it is assumed that the modulation symbols are uncorrelated in time and the expectation is taken over all inter-symbol interference in the above (all transmitted signal components not transmitted at time n), then the expectation can be expressed as:

$$E[\hat{\underline{x}}(n) \mid \underline{x}(n)] = \underline{M}E[\underline{r}(n) \mid \underline{x}(n)] \quad \text{Eq (32)}$$

$$= [\underline{M}(0)\underline{H}(0) + \underline{M}(-1)\underline{H}(1) + \ldots + \underline{M}(-L)\underline{H}(L)]\underline{x}(n)$$

$$= \underline{M}\tilde{\underline{H}}\underline{x}(n)$$

$$= \underline{V}\underline{x}(n)$$

where $$\underline{V} = \underline{M}\tilde{\underline{H}} = \tilde{\underline{H}}^H \underline{R}^{-1} \tilde{\underline{H}}.$$

Finally, after averaging over the interference from other spatial subchannels, the average value of the signal from the i-th transmit antenna at time n can be expressed as:

$$E[\hat{x}_i(n) \mid x_i(n)] = v_{ii} x_i(n), \quad \text{Eq (33)}$$

where $v_{ii}$ is the i-th diagonal element of $\underline{V}$ ($v_{ii}$ is a scalar), and $\hat{x}_i(n)$ is the i-th element of the MMSE-LE estimate.

By defining $$\underline{D}_V^{-1} = \text{diag}(1/v_{11}, 1/v_{22}, \ldots, 1/v_{N_T N_T}), \quad \text{Eq (34)}$$

then the unbiased MMSE-LE estimate of the transmitted signal vector at time n can be expressed as:

$$\tilde{x}(n) = \underline{D}_V^{-1} \hat{\underline{x}}(n) = \underline{D}_V^{-1} \underline{M}\underline{r}(n). \quad \text{Eq (35)}$$

The error covariance matrix associated with the unbiased MMSE-LE can be expressed as:

$$\underline{\varphi}_{ee} = \underline{U} = E\{[\underline{x}(n) - \underline{D}_V^{-1}\underline{M}\underline{r}(n)][\underline{x}(n) - \underline{r}^H(n)\underline{M}^H \underline{D}_V^{-1}]\} \quad \text{Eq (36)}$$

$$= \underline{I} - \underline{D}_V^{-1}\underline{V} - \underline{V}\underline{D}_V^{-1} + \underline{D}_V^{-1}\underline{V}\underline{D}_V^{-1}.$$

The SNR associated with the estimate of the symbol transmitted on the i-th transmit antenna can finally be expressed as:

$$SNR_i = \frac{1}{u_{ii}} = \frac{v_{ii}}{1 - v_{ii}}. \quad \text{Eq (37)}$$

The MMSE-LE technique can be implemented by RX MIMO processor 156b in FIG. 6. In this case, multiplier 614 can be designed to perform the convolution of the sequence of received signal vectors $\underline{r}(n)$ with the sequence of weight matrices $\underline{M}(k)$, as shown in equation (24). Multiplier 616 can be designed to perform the pre-multiply of the estimate $\hat{x}$ with the diagonal matrix $\underline{D}_v^{-1}$ to derive the unbiased MMSE-LE estimate $\tilde{x}$, as shown in equation (35). Adaptive processor 622 can be designed to derive the sequence of weight matrices $\underline{M}(k)$ as shown in equation (30) and the diagonal matrix $\underline{D}_v^{-1}$ as shown in equation (34). The subsequent processing may be achieved in similar manner as that described above for the MMSE technique. The SNR of the symbol stream transmitted from the j-th transmit antenna may be estimated based on equation (37) by CSI processor 620.

DFE Technique

Figure 7:
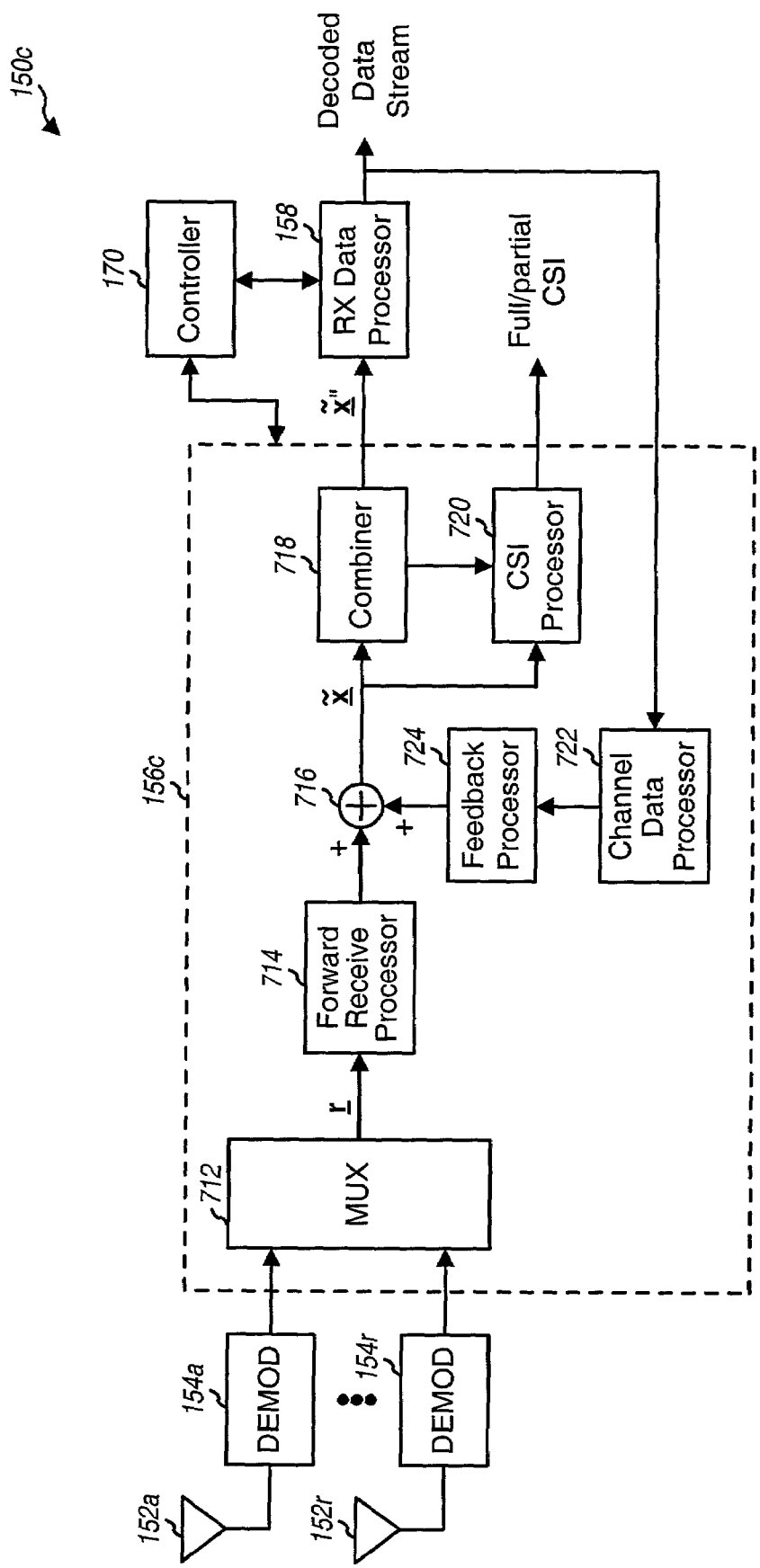

FIG. 7 is a block diagram of an embodiment of a RX MIMO processor 156c, which is capable of implementing the DFE spatial-time equalization technique. Within RX MIMO processor 156c, the modulation symbols from the $N_R$ receive antennas are multiplexed by a multiplexer 712 to form a stream of received modulation symbol vectors $\underline{r}(n)$. The vectors $\underline{r}(n)$ are then processed by a forward receive processor 714 to provide estimated modulation symbols for the data stream to be recovered. Forward receive processor 714 may implement the CCMI or MMSE technique described above or some other linear spatial equalization technique. A summer 716 then combines an estimated distortion components provided by a feedback processor 724 with the estimated modulation symbols from forward receive processor 714 to provide "equalized" modulation symbols having the distortion component approximately removed. Initially, the estimated distortion components are zero and the equalized modulation symbols are simply the estimated modulation symbols. The equalized modulation symbols from summer 716 are the estimate $\tilde{x}$ of the transmitted symbol vector $\underline{x}$.

Again, for certain transmit processing schemes, a number of streams of estimated modulation symbols $\tilde{x}$ corresponding to a number of transmit antennas used for transmitting a data stream may be provided to a combiner 718, which combines redundant information across time, space, and frequency. The combined modulation symbols $\tilde{x}''$ are then provided to RX data processor 158. And for some other transmit processing schemes, the estimated modulation symbols $\tilde{x}$ may be provided directly to RX data processor 158. RX data processor 158 demodulates, de-interleaves, and decodes the modulation symbol stream corresponding to the data stream being recovered, as described above in FIG. 8.

The decoded data stream is also re-encoded and re-modulated by a channel data processor 722 to provide "remodulated" symbols, which are estimates of the modulation symbols at the transmitter. Channel data processor 722 performs the same processing (e.g., encoding, interleaving, and modulation) as that performed at the transmitter for the data stream. The remodulated symbols from channel data processor 722 are provided to feedback processor 724, which processes the symbols to derive the estimated distortion components. Feedback processor 724 may implement a linear spatial equalizer (e.g., a linear transversal equalizer).

For the DFE technique, the decoded data stream is used to derive an estimate of the distortion generated by the already decoded information bits. If the data stream is decoded without errors (or with minimal errors), then the distortion component may be accurately estimated and the inter-symbol interference contributed by the already decoded information bits may be effectively canceled out. The processing performed by forward receive processor 714 and feedback processor 724 are typically adjusted simultaneously to minimize the mean square error (MSE) of the inter-symbol interference in the equalized modulation symbols. DFE processing is described in further detail in the aforementioned paper by Ariyavistakul et al.

For the DFE technique, the estimate of the transmitted symbol vector at time n, $\tilde{x}(n)$, can be expressed as:

$$\hat{x}(n) = \sum_{k=-K_1}^{0} \underline{M}_f(k)\underline{r}(n-k) + \sum_{k=1}^{K_2} \underline{M}_b(k)\tilde{x}(n-k), \quad \text{Eq (38)}$$

where $\underline{r}(n)$ is the vector of received modulation symbols, which is given above in equation (23), $\tilde{x}(n)$ is the vector of symbol decisions provided by RX data processor 158, $\underline{M}_f(k)$, $-K_1 \leq k \leq 0$ is the sequence of $(K_1+1)$-$(N_T \times N_R)$ feed-forward coefficient matrices used by forward receive processor 714, and $\underline{M}_b(k)$, $1 \leq k \leq K_2$ is the sequence of $K_2$-$(N_T \times N_R)$ feedback coefficient matrices used by feedback processor 724. Equation (38) can also be expressed as:

$$\hat{x}(n) = \underline{M}_f \underline{r}(n) + \underline{M}_b \underline{\tilde{x}}(n), \quad \text{Eq (39)}$$

where $$\underline{M}_f = [\underline{M}(-K_1) \underline{M}(-K_1+1) \ldots \underline{M}(0)], \underline{M}_b = [\underline{M}(1) \underline{M}(2) \ldots \underline{M}(K_2)],$$

$$\underline{\tilde{x}}(n) = \begin{bmatrix} \tilde{x}(n-1) \\ \tilde{x}(n-2) \\ \vdots \\ \tilde{x}(n-K_2) \end{bmatrix}, \text{ and } \underline{r}(n) = \begin{bmatrix} r(n+K_1) \\ r(n+K_1-1) \\ \vdots \\ r(n) \end{bmatrix}.$$

If the MMSE criterion is used to find the coefficient matrices, then the solutions for $\underline{M}_f$ and $\underline{M}_b$ that minimize the mean square error $\epsilon = E\{\underline{e}^H(k)\underline{e}(k)\}$ can be used, where the error $\underline{e}(k)$ is expressed as:

$$\underline{e}(k) = \hat{x}(k) - \underline{x}(k).$$

The MMSE solution for the feed-forward filter can then be expressed as:

$$\underline{M}_f = \tilde{H}\tilde{H}^H \tilde{R}^{-1}, \quad \text{Eq (40)}$$

where $$\underline{\tilde{H}} = \begin{bmatrix} \underline{0}_{(K_1-L)N_R \times N_T} \\ H(L) \\ H(L-1) \\ \vdots \\ H(0) \end{bmatrix},$$

and $\tilde{R}$ is a $(K_1+1)N_R \times (K_1+1)N_R$ matrix made up of $N_R \times N_R$ blocks. The (i,j)-th block in $\tilde{R}$ is given by:

$$\tilde{R}(i,j) = \sum_{m=0}^{K_1-i+1} H(m) H^H(m+i-j) + \sigma^2 I \delta(i-j). \quad \text{Eq (41)}$$

The MMSE solution for the feed-back filter is:

$$\underline{M}_b(k) = -\sum_{j=K_1}^{0} \underline{M}_f(j)\underline{\tilde{H}}(k-j), \ 1 \le k \le K_2. \qquad \text{Eq (42)}$$

As in the MMSE-LE described above, the unbiased estimate is first determined by finding the conditional mean value of the transmitted symbol vector:

$$E[\hat{\underline{x}}(n)|\underline{x}(n)] = \underline{M}_f \underline{\tilde{H}} \underline{x}(n) = \underline{V}_{dfe}\underline{x}(n), \qquad \text{Eq (43)}$$

where $\underline{V}_{dfe} = \underline{M}_f \underline{\tilde{H}} = \underline{\tilde{H}}^H \underline{\tilde{R}}^{-1} \underline{\tilde{H}}$. Next, the mean value of the i-th element of $\hat{x}(n)$, $\hat{x}_i(n)$, is expressed as:

$$E[\hat{x}_i(n)|x_i(n)] = v_{dfe,ii}x_i(n),$$

where $v_{dfe,ii}$ is the i-th diagonal element of $\underline{V}_{dfe}$. To form the unbiased estimate, similar to that described above, the diagonal matrix whose elements are the inverse of the diagonal elements of $\underline{V}_{dfe}$ is first defined as:

$$\underline{D}_{Vdfe}^{-1} = \text{diag}(v_{dfe,11}, v_{dfe,22}, \ldots, v_{dfe,N_TN_T}). \qquad \text{Eq (44)}$$

The unbiased estimate can then be expressed as:

$$\hat{\hat{x}}(n) = \underline{D}_{Vdfe}^{-1}\hat{\underline{x}}(n) = \underline{D}_{Vdfe}^{-1}\underline{M}_f \underline{r}(n) + \underline{D}_{Vdfe}^{-1}\underline{M}_b \tilde{\underline{x}}(n). \qquad \text{Eq (45)}$$

The resulting error covariance matrix is given by:

$$\begin{aligned}\underline{\varphi}_{ee} = \underline{U}_{dfe} &= E\left\{\left[\underline{x}(n) - \underline{D}_{Vdfe}^{-1}\left(\underline{M}_f \underline{r}(n) + \underline{M}_b \tilde{\underline{x}}(n)\right)\right]\right. \\ &\quad \left.\left[\underline{x}^H(n) - \left(\underline{r}^H(n)\underline{M}_f^H + \tilde{\underline{x}}^H(n)\underline{M}_b^H\right)\underline{D}_{Vdfe}^{-1}\right]\right\} \\ &= \underline{I} - \underline{D}_{Vdfe}^{-1}\underline{V}_{dfe} - \underline{V}_{dfe}\underline{D}_{Vdfe}^{-1} + \underline{D}_{Vdfe}^{-1}\underline{V}_{dfe}\underline{D}_{Vdfe}^{-1}\end{aligned} \qquad \text{Eq (46)}$$

The SNR associated with the estimate of the symbol transmitted on the i-th transmit antenna can then be expressed as:

$$SNR_i = \frac{1}{u_{dfe,ii}} = \frac{v_{dfe,ii}}{1 - v_{dfe,ii}}. \qquad \text{Eq (47)}$$

MIMO Receiver Utilizing Full-CSI Technique

For the full-CSI technique, the received signals at the output of the $N_R$ receive antennas may be expressed as shown above in equation (2), which is:

$$\underline{r} = \underline{H}\underline{x} + \underline{n}.$$

The eigenvector decomposition of the Hermitian matrix formed by the product of the channel matrix with its conjugate-transpose can be expressed as:

$$\underline{H}^H\underline{H} = \underline{E}\Lambda\underline{E}^H,$$

where $\underline{E}$ is the eigenvector matrix, and $\Lambda$ is a diagonal matrix of eigenvalues, both of dimension $N_T \times N_T$. The transmitter preconditions a set of $N_T$ modulation symbols $\underline{b}$ using the eigenvector matrix $\underline{E}$, as shown above in equation (1). The transmitted (preconditioned) modulation symbols from the $N_T$ transmit antennas can thus be expressed as:

$$\underline{x} = \underline{E}\underline{b}.$$

Since $\underline{H}^H\underline{H}$ is Hermitian, the eigenvector matrix is unitary. Thus, if the elements of $\underline{b}$ have equal power, the elements of $\underline{x}$ also have equal power. The received signal may then be expressed as:

$$\underline{r} = \underline{H}\underline{E}\underline{b} + \underline{n}. \qquad \text{Eq (48)}$$

The receiver performs a channel-matched-filter operation, followed by multiplication by the right eigenvectors. The result of the channel-matched-filter and multiplication operations is a vector $\underline{z}$, which can be expressed as:

$$\underline{z} = \underline{E}^H\underline{H}^H\underline{H}\underline{E}\underline{b} + \underline{E}^H\underline{H}^H\underline{n} = \Lambda\underline{b} + \underline{n}', \qquad \text{Eq (49)}$$

where the new noise term has covariance that can be expressed as:

$$E(\hat{n}\hat{n}^H) = E(\underline{E}^H\underline{H}^H\underline{n}\underline{n}^H\underline{H}\underline{E}) = \underline{E}^H\underline{H}^H\underline{H}\underline{E} = \Lambda, \qquad \text{Eq (50)}$$

i.e., the noise components are independent with variance given by the eigenvalues. The SNR of the i-th component of $\underline{z}$ is $\lambda_i$, which is the i-th diagonal element of $\Lambda$.

Full-CSI processing is described in further detail in the aforementioned U.S patent application Ser. No. 09/532,492.

The receiver embodiment shown in FIG. 5 may also be used to implement the full-CSI technique. The received modulation symbol vectors $\underline{r}$ are filtered by match filter 514, which pre-multiplies each vector $\underline{r}$ with the conjugate-transpose channel coefficient matrix $\underline{H}^H$, as shown above in equation (49). The filtered vectors are further pre-multiplied by multiplier 516 with the right eigenvectors $\underline{E}^H$ to form an estimate $\underline{z}$ of the modulation symbol vector $\underline{b}$, as shown above in equation (49). For the full-CSI technique, matrix processor 524 is configured to provide the right eigenvectors $\underline{E}^H$. The subsequent processing (e.g., by combiner 518 and RX data processor 158) may be achieved as described above.

For the full-CSI technique, the transmitter unit can select a coding scheme and a modulation scheme (i.e., a signal constellation) for each of the eigenvectors based on the SNR that is given by the eigenvalue. Providing that the channel conditions do not change appreciably in the interval between the time the CSI is measured at the receiver and reported and the time it is used to precondition the transmission at the transmitter, the performance of the communications system may be equivalent to that of a set of independent AWGN channels with known SNRs.

Deriving and Reporting Full or Partial CSI

The full or partial CSI may comprise any type of information that is indicative of the characteristics of the communication link. Various types of information may be provided as full or partial CSI, and some examples are described below.

Partial CSI

In one embodiment, the partial CSI comprises SNR, which is derived as the ratio of the signal power over the noise plus interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the partial CSI comprises signal power and interference plus noise power. These two components may be separately derived and provided for each transmission channel or a set of transmission channels used for data transmission.

In yet another embodiment, the partial CSI comprises signal power, interference power, and noise power. These three components may be derived and provided for each transmission channel or a set of transmission channels used for data transmission.

In yet another embodiment, the partial CSI comprises signal-to-noise ratio plus a list of interference powers for each observable interference term. This information may be derived and provided for each transmission channel or a set of transmission channels used for data transmission.

In yet another embodiment, the partial CSI comprises signal components in a matrix form (e.g., $N_T \times N_R$ complex entries for all transmit-receive antenna pairs) and the noise plus interference components in matrix form (e.g., $N_T \times N_R$ complex entries). The transmitter unit may then properly combine the signal components and the noise plus interference components for the appropriate transmit-receive antenna pairs to derive the quality for each transmission channel used for data transmission (e.g., the post-processed SNR for each transmitted data stream, as received at the receiver unit).

In yet another embodiment, the partial CSI comprises a data rate indicator for each transmit data stream. The quality of a transmission channel to be used for data transmission may be determined initially (e.g., based on the SNR estimated for the transmission channel) and a data rate corresponding to the determined channel quality may then be identified (e.g., based on a look-up table). The identified data rate is indicative of the maximum data rate that may be transmitted on the transmission channel for the required level of performance. The data rate is then mapped to and represented by a data rate indicator (DRI), which can be efficiently coded. For example, if (up to) seven possible data rates are supported by the transmitter unit for each transmit antenna, then a 3-bit value may be used to represent the DRI where, e.g., a zero can indicate a data rate of zero (i.e., don't use the transmit antenna) and 1 through 7 can be used to indicate seven different data rates. In a typical implementation, the channel quality measurements (e.g., the SNR estimates) are mapped directly to the DRI based on, e.g., a look-up table.

In yet another embodiment, the partial CSI comprises an indication of the particular processing scheme to be used at the transmitter unit for each transmit data stream. In this embodiment, the indicator may identify the particular coding scheme and the particular modulation scheme to be used for the transmit data stream such that the desired level of performance is achieved.

In yet another embodiment, the partial CSI comprises a differential indicator for a particular measure of quality for a transmission channel. Initially, the SNR or DRI or some other quality measurement for the transmission channel is determined and reported as a reference measurement value. Thereafter, monitoring of the quality of the transmission channel continues, and the difference between the last reported measurement and the current measurement is determined. The difference may then be quantized to one or more bits, and the quantized difference is mapped to and represented by the differential indicator, which is then reported. The differential indicator may indicate an increase or decrease to the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

Full CSI

In one embodiment, the full CSI comprises eigenmodes plus any other information that is indicative of, or equivalent to, SNR. For example, the SNR related information may be a data rate indication per eigenmode, an indication of the modulation/coding scheme to be used per eigenmode, signal and interference power per eigenmode, signal to interference ratio per eigenmode, and so on. The information described above for the partial CSI may also be provided as the SNR related information.

In another embodiment, the full CSI comprises a matrix $\underline{A}=\underline{H}^H\underline{H}$, where $\underline{H}$ is the channel coefficient matrix of $N_R \times N_T$ complex channel response values, and $\underline{H}^H$ is the conjugate-transpose of $\underline{H}$. The matrix $\underline{A}$ is sufficient to determine the eigenmodes and eigenvalues of the channel, and may be a more efficient representation of the channel (e.g., fewer bits may be required to transmit the full CSI for this representation).

Differential update techniques may also be used for all of the full CSI data types. For example, differential updates to the full CSI characterization may be sent periodically, when the channel changes by some amount, and so on.

Other forms of full or partial CSI may also be used and are within the scope of the invention. In general, the full or partial CSI includes sufficient information in whatever form that may be used to adjust the processing at the transmitter such that the desired level of performance is achieved for the transmitted data streams.

The CSI may be derived based on the signals transmitted from the transmitter unit and received at the receiver unit. In an embodiment, the CSI is derived based on a pilot reference included in the transmitted signals. Alternatively or additionally, the CSI may be derived based on the data included in the transmitted signals.

In yet another embodiment, the CSI comprises one or more signals transmitted on the reverse link from the receiver unit to the transmitter unit. In some systems, a degree of correlation may exist between the forward and reverse links (e.g. for time division duplexed (TDD) systems, where the uplink and downlink share the same band in a time division multiplexed manner). In these systems, the quality of the forward link may be estimated (to a requisite degree of accuracy) based on the quality of the reverse link, which may be estimated based on signals (e.g., pilot signals) transmitted from the receiver unit. The pilot signals transmitted on the reverse link would then represent a means for which the transmitter could estimate the CSI as observed by the receiver unit.

The signal quality may be estimated at the receiver unit based on various techniques. Some of these techniques are described in the following patents, which are assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, and U.S Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

The CSI may be reported back to the transmitter using various CSI transmission schemes. For example, the CSI may be sent in full, differentially, or a combination thereof. In one embodiment, full or partial CSI is reported periodically, and differential updates are sent based on the prior transmitted CSI. As an example for full CSI, the updates may be corrections (based on an error signal) to the reported eigenmodes. The eigenvalues typically do not change as rapidly as the eigenmodes, so these may be updated at a lower rate. In another embodiment, the CSI is sent only when there is a change (e.g., if the change exceeds a particular threshold), which may lower the effective rate of the feedback channel. As an example for partial CSI, the SNRs may be sent back (e.g., differentially) only when they change. For an OFDM system (with or without MIMO), correlation in the frequency domain may be exploited to permit reduction in the amount of CSI to be fed back. As an example for an OFDM system using partial CSI, if the SNR corresponding to a particular spatial subchannel for $N_M$ frequency subchannels is similar, the SNR and the first and last frequency subchannels for which this condition is true may be reported. Other compression and feedback channel error recovery techniques to reduce the amount of data to be fed back for CSI may also be used and are within the scope of the invention.

Various types of information for CSI and various CSI reporting mechanisms are also described in U.S. patent application Ser. No. 08/963,386, entitled "METHOD AND APPARATUS FOR HIGH RATE PACKET DATA TRANSMISSION," filed Nov. 3, 1997, assigned to the assignee of the present application, and in "TIE/EIA/IS-856 cdma2000 High Rate Packet Data Air Interface Specification", both of which are incorporated herein by reference.

Using either the partial-CSI (e.g., CCMI, MMSE, MMSE-LE, and DFE) techniques or full-CSI technique described herein, the full or partial CSI of each transmission channel may be obtained for the received signals. The determined full or partial CSI for the transmission channels may then be reported back to the transmitter system via a reverse channel. For the partial-CSI techniques, adaptive processing may be achieved without complete CSI. For the full-CSI technique, sufficient information (and not necessarily the explicit eigenvalues and eigenmodes) is fed back to the transmitter to facilitate calculation of the eigenvalues and eigenmodes for each frequency subchannel utilized. By feeding back the CSI, it is possible to implement adaptive processing (e.g., adaptive coding and modulation) to improve utilization of the MIMO channel.

Referring back to FIG. 1, the full or partial CSI (e.g., channel SNR) determined by RX MIMO processor 156 is provided to a TX data processor 162, which processes the CSI and provides processed data to one or more modulators 154. Modulators 154 further condition the processed data and transmit the CSI back to transmitter system 110 via a reverse channel.

At system 110, the transmitted feedback signal is received by antennas 124, demodulated by demodulators 122, and provided to a RX data processor 132. RX data processor 132 performs processing complementary to that performed by TX data processor 162 and recovers the reported full/partial CSI, which is then provided to, and used to adjust the processing by, TX data processor 114 and TX MIMO processor 120.

Transmitter system 110 may adjust (i.e., adapt) its processing based on the full/partial CSI from receiver system 150. For example, the coding for each transmission channel may be adjusted such that the information bit rate matches the transmission capability supported by the channel SNR. Additionally, the modulation scheme for the transmission channel may be selected based on the channel SNR. Other processing (e.g., interleaving) may also be adjusted and are within the scope of the invention. The adjustment of the processing for each transmission channel based on the determined SNR for the channel allows the MIMO system to achieve high performance (i.e., high throughput or bit rate for a particular level of performance). The adaptive processing can be applied to a single-carrier MIMO system or a multi-carrier based MIMO system (e.g., a MIMO system utilizing OFDM).

The adjustment in the coding and the selection of the modulation scheme at the transmitter system may be achieved based on numerous techniques, one of which is described in the aforementioned U.S. patent application Ser. Nos. 09/776,975, 09/532,492, and 09/854,235.

The partial-CSI techniques (e.g., CCMI, MMSE, MMSE-LE, and DFE techniques) and full-CSI techniques are receiver processing techniques that allow a MIMO system to utilize the additional dimensionalities created by the use of multiple transmit and receive antennas, which is a main advantage for employing MIMO. The partial-CSI techniques may allow the same number of modulation symbols to be transmitted for each time slot as for a MIMO system utilizing full CSI. However, other receiver processing techniques may also be used in conjunction with the full/partial CSI techniques described herein and are within the scope of the invention. Analogously, FIGS. 5 through 7 represent three embodiments of a receiver system capable of processing a MIMO transmission, determining the characteristics of the transmission channels (e.g., the SNR), and reporting full or partial CSI back to the transmitter system. Other designs based on the techniques presented herein and other receiver processing techniques can be contemplated and are within the scope of the invention.

MIMO System Operating Schemes

Various operating schemes may be implemented for a MIMO and/or OFDM system that employs adaptive transmitter processing techniques described herein based on the available CSI. Some of these operating schemes are described in further detail below.

In one operating scheme, the coding and modulation scheme for each transmission channel is selected based on the channel's transmission capability, as determined by the channel's available CSI (e.g., SNR). This scheme can provide improved performance, especially when used in combination with the successive cancellation receiver processing technique described in the aforementioned U.S. patent application Ser. No. 09/854,235. When there is a large disparity between the worst-case and best-case transmission channels, the coding may be selected to introduce sufficient redundancy to allow the receiver system to recover the original data stream. For example, the worst transmission channel may have associated with it a poor SNR at the receiver output. The forward error correction (FEC) code may then be selected to be powerful enough to allow the symbols transmitted on the worst-case transmission channel to be correctly received at the receiver system.

When the transmitter is provided with the SNR per recovered transmitted signal, a different coding and/or modulation scheme may be used for each transmitted signal. For example, a specific coding and modulation scheme may be selected for each transmitted signal based on its SNR so that the error rates associated with the transmitted signals are approximately equal. In this way, throughput for the transmitted signals are dictated by the their respective SNRs, and not by the SNR of the worst-case transmitted signal.

As an example, consider a 4×4 MIMO system with 4 transmit and 4 receive antennas (and which may employing the successive cancellation receiver processing technique). For this example, the SNR for the four transmitted signals are 5 dB, 8.5 dB, 13 dB, and 17.5 dB. If the same coding and modulation scheme is used for all four transmitted signal, the selected scheme would be dictated by the transmitted signal having 5 dB SNR. Using the information given in Table 1, each transmit antenna would employ a coding rate of ¾ and QPSK modulation, giving a total modulation efficiency of 6 information bits/symbol, or 1.5 information bits/symbol/transmitted signal.

With CSI available, the transmitter may select the following coding and modulation schemes for the four transmitted signals, as shown in Table 2.

TABLE 2

| SNR (dB) | Coding Rate | Modulation Symbol | # of Information Bits/Symbol |
|---|---|---|---|
| 5 | 3/4 | QPSK | 1.5 |
| 8.5 | 5/8 | 16-QAM | 2.5 |
| 13 | 7/12 | 64-QAM | 3.5 |
| 17.5 | 5/6 | 64-QAM | 5 |

By adjusting the coding and modulation scheme at the transmitter based on the available CSI, the effective modulation efficiency achieved is more than doubled to 12.5 bits/symbol versus 6 bits/symbol without CSI. The decoded error rate for each of the transmitted signals will be approximately equal since the coding and modulation scheme was selected to achieve this level of performance.

With CSI available at the transmitter, throughput is no longer dictated by the worst-case transmitted signal since the coding and modulation schemes are selected to provide a particular level of performance (e.g., a particular PER) on each transmission channel based on the channel's SNR. If FEC coding is applied to each transmission channel independently, the minimum amount of redundancy required to meet the target level of performance is used for each transmission channel, and throughput is maximized. In fact, it can be shown that the performance achievable with the combination of adaptive transmitter processing based on partial CSI (e.g., SNR) and successive cancellation receiver processing rivals that of a full-CSI processing scheme (whereby full characterization is available for each transmit-receive antenna pair) under certain operating conditions.

In another operating scheme, the transmitter it not provided with CSI for each transmission channel, but may be provided with a single value indicative of the average characteristics (e.g., the average SNR) for all transmission channels, or possibly some information indicating which transmit antennas to be used for data transmission. In this scheme, the transmitter may employ the same coding and modulation scheme on all transmit antennas used for data transmission, which may be a subset of the $N_T$ available transmit antennas.

If the same coding and modulation scheme is used for all or a number of transmitted signals, then the recovered transmitted signal with the worst SNR will have the highest decoded error rate. This may ultimately limit the performance of the MIMO system since the coding and modulation scheme is selected so that the error rate associated with the worst-case transmitted signal meets the overall error rate requirements. To improve efficiency, additional receive antennas may be used to provide improved error rate performance on the recovered transmitted signals. By employing more receive antennas than transmit antennas, the error rate performance of the first recovered transmitted signal has a diversity order of $(N_R-N_T+1)$ and reliability is increased.

In yet another operating scheme, the transmitted data streams are "cycled" across all available transmit antennas. This scheme improves the SNR statistics for each of the recovered transmitted signals since the transmitted data is not subjected to the worst-case transmission channel, but instead is subjected to all transmission channels. The decoder associated with a specific data stream is effectively presented with "soft decisions" that are representative of the average across all transmit-receive antenna pairs. This operating scheme is described in further detail in European Patent Application Serial No. 99302692.1, entitled "WIRELESS COMMUNICATIONS SYSTEM HAVING A SPACE-TIME ARCHITECTURE EMPLOYING MULTI-ELEMENT ANTENNAS AT BOTH THE TRANSMITTER AND RECEIVER," and incorporated herein by reference.

The receiver processing techniques described herein allows a MIMO system to utilize the additional dimensionalities created by the use of multiple transmit and receive antennas, which is a major advantage for employing MIMO. Depending on the characteristics of the MIMO channel, a linear spatial equalization technique (e.g., CCMI or MMSE) or a space-time equalization technique (e.g., MMSE-LE, DFE, or MLSE) may be used to process the received signals.

Other linear spatial and space-time receiver processing techniques may also be used in conjunction with the adaptive transmitter processing technique, and this is within the scope of the invention. Analogously, FIGS. 5 through 7 represent embodiments of three receiver processing techniques capable of processing a MIMO transmission and determining the characteristics of the transmission channels (e.g., the SNR). Other receiver designs based on the techniques presented herein and other receiver processing techniques can be contemplated and are within the scope of the invention.

The partial-CSI technique (e.g., CCMI, MMSE, MMSE-LE, DFE, MLSE, and others) may also be used in a straightforward manner without adaptive processing at the transmitter when only the overall received signal SNR or the attainable overall throughput estimated based on such SNR is feed back. In one implementation, a modulation format is determined based on the received SNR estimate or the estimated throughput, and the same modulation format is used for all transmission channels. This method may reduce the overall system throughput but may also greatly reduce the amount of information sent back over the reverse link.

System Performance

Improvement in system performance may be realized with the use of the full/partial-CSI techniques of the invention. The system throughput with partial CSI processing can be computed and compared against the throughput with full CSI processing. The system throughput can be defined as:

$$C = \sum_{i=1}^{N_C} \log_2(1+\gamma_i),$$

where $\gamma_i$ is the SNR of each received modulation symbol for the partial CSI techniques or the SNR of each transmission channel for the full CSI technique. The SNR for various receiver processing techniques can be summarized as follows:

$$\gamma_i = \frac{1}{\sigma_n^2 r_{ii}}, \quad \text{for the } CCMI \text{ technique}$$

$$\gamma_i = \frac{1}{u_{ii}}, \quad \text{for the } MMSE \text{ technique, and}$$

$$\gamma_i = \frac{\lambda_u}{\sigma_n^2}, \quad \text{for full } CSI \text{ technique.}$$

Figure 9A:
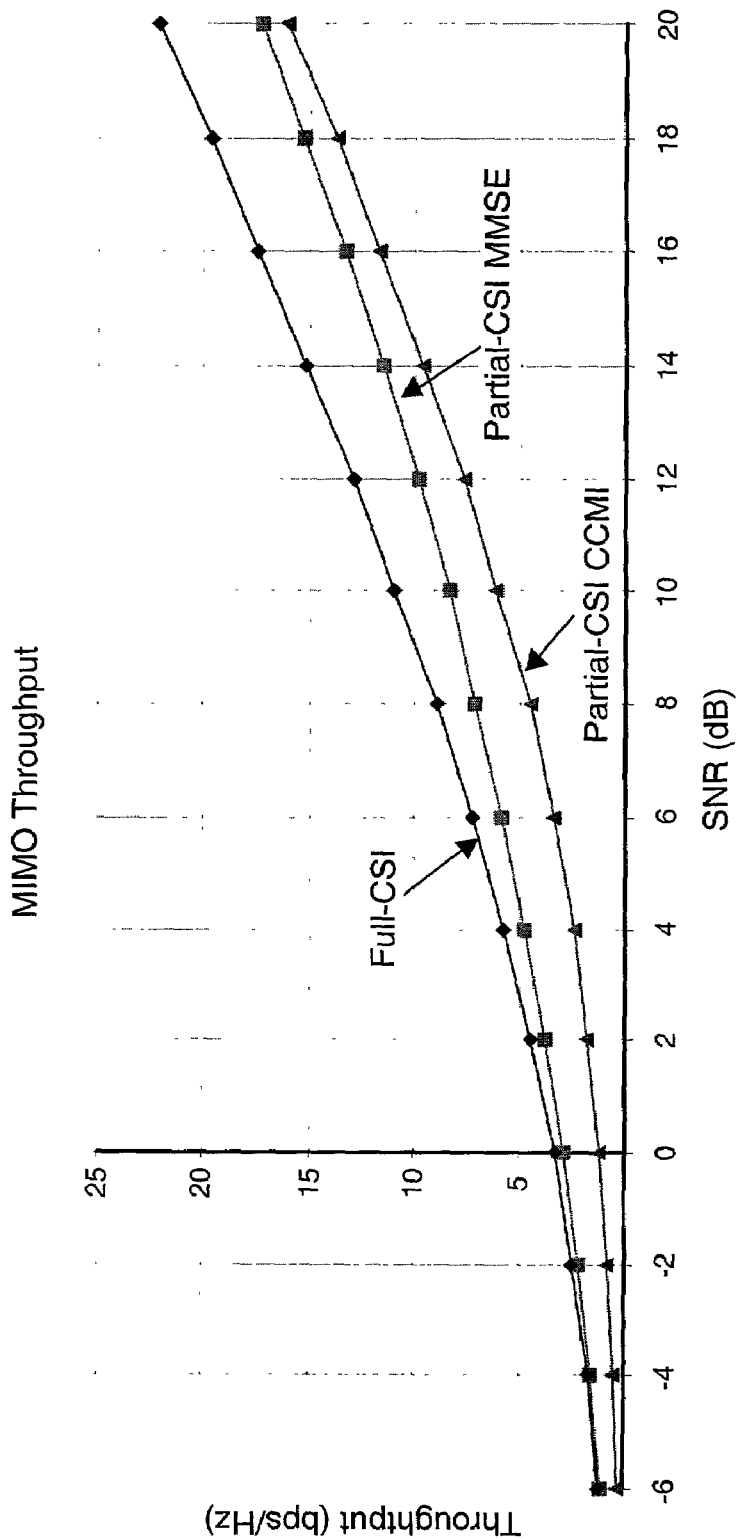
FIG. 9A shows the average throughput for the MIMO system for three receiver processing techniques and for different SNR values.
Figure 9B:
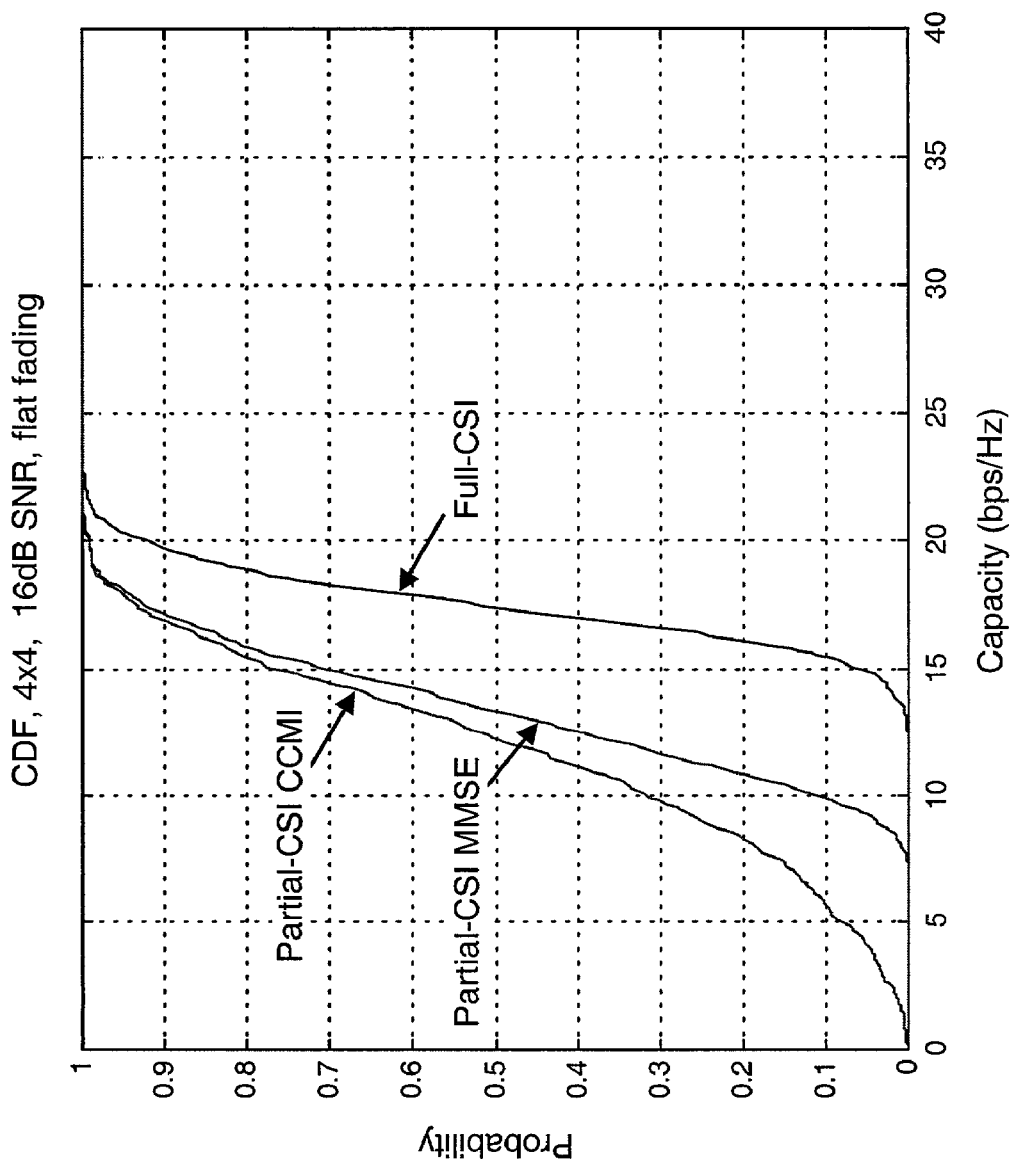
FIG. 9B shows the cumulative probability distribution functions (CDF) for the three receiver processing techniques generated based on the histogram of the data.

FIGS. 9A and 9B show the performance of a 4×4 MIMO system employing partial-CSI and full-CSI techniques. The results are obtained from a computer simulation. In the simulation, the elements of each channel coefficient matrix H are modeled as independent Gaussian random variable with zero mean and unity variance. For each calculation, a number of random matrix realizations are generated and the throughput computed for the realization are averaged to generate the average throughput.

FIG. 9A shows the average throughput for the MIMO system for the full-CSI, partial-CSI CCMI, and partial-CSI MMSE techniques for different SNR values. It can be seen from FIG. 9A that the throughput of the partial-CSI MMSE technique is approximately 75% of the full-CSI throughput at high SNR values, and approaches the full CSI throughput at low SNR values. The throughput of the partial-CSI CCMI technique is approximately 75%–90% of the throughput of the partial-CSI MMSE technique at high SNR values, and is approximately less than 30% of the MMSE throughput at low SNR values.

FIG. 9B shows the cumulative probability distribution functions (CDF) for the three techniques generated based on the histogram of the data. FIG. 9B shows that at an average SNR of 16 dB per transmission channel, there are approximately 5% cases when the throughput is less than 2 bps/Hz for the CCMI technique. On the other hand, the throughput of the MMSE technique is above 7.5 bps/Hz for all cases at the same SNR. Thus, the MMSE technique is likely to have lower outage probability than the CCMI technique.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Certain aspects of the invention may be implemented with a combination of software and hardware. For example, computations for the symbol estimates for the linear spatial equalization, the space-time equalization, the full-CSI processing, and the derivation of the CSI (e.g., the channel SNRs) may be performed based on program codes executed on a processor (controllers 170 in FIGS. 5 through 7).

Headings are included herein for reference and to aid in the locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data from a transmitter unit to a receiver unit in a multiple-input multiple-output (MIMO) communication system, comprising:
   at the receiver unit,
   receiving a plurality of signals via a plurality of receive antennas, wherein the received signal from each receive antenna comprises a combination of one or more signals transmitted from the transmitter unit,
   processing the received signals to derive channel state information (CSI) indicative of characteristics of a plurality of transmission channels used for data transmission, and
   transmitting the CSI back to the transmitter unit; and
   at the transmitter unit,
   receiving the CSI from the receiver unit,
   processing data for transmission to the receiver unit based on the received CSI to provide modulation symbols, and
   conditioning the modulation symbols to generate a plurality of signals suitable for transmission from the transmitter unit to the receiver unit.

2. The method of claim 1, wherein the processing at the transmitter unit includes coding the data based on the CSI derived for the plurality of transmission channels.

3. The method of claim 2, wherein the data for each transmission channel is independently coded with a particular coding scheme selected based on the CSI derived for the transmission channel.

4. The method of claim 2, wherein the processing at the transmitter unit further includes modulating the coded data based on the CSI derived for the plurality of transmission channels.

5. The method of claim 4, wherein the coded data for each transmission channel is modulated with a particular modulation scheme selected based on the CSI derived for the transmission channel.

6. The method of claim 1, wherein the processing at the transmitter unit is adaptively adjusted based on the received CSI to provide a particular level of performance at the receiver unit for the data transmission.

7. The method of claim 1, wherein the processing at the transmitter unit includes preconditioning the modulation symbols based on the CSI derived for the plurality of transmission channels.

8. The method of claim 1, wherein the transmitted CSI comprises partial CSI for the plurality of transmission channels.

9. The method of claim 8, wherein the partial CSI comprises estimates of signal-to-noise-plus-interference ratios (SNRs) for the plurality of transmission channels.

10. The method of claim 8, wherein the partial CSI comprises signal power and interference and noise power measurements for the plurality of transmission channels.

11. The method of claim 8, wherein the partial CSI comprises indications of data rates supported by the plurality of transmission channels.

12. The method of claim 8, wherein the partial CSI comprises indications of coding and modulation schemes to be used for the plurality of transmission channels.

13. The method of claim 8, wherein the partial CSI comprises differential updates to prior reported channel characteristics.

14. The method of claim 1, wherein the transmitted CSI comprises full CSI for the plurality of transmission channels.

15. The method of claim 14, wherein the full CSI comprises characterizations for a MIMO channel between the transmitter unit and receiver unit, and wherein the MIMO channel includes the plurality of transmission channels.

16. The method of claim 15, wherein the characterizations comprise complex channel response values for the MIMO channel.

17. The method of claim 14, wherein the full CSI comprises eigenmodes and SNR related information.

18. The method of claim 14, wherein the full CSI comprises eigenmodes and eigenvalues for the MIMO channel.

19. The method of claim 18, wherein the processing at the transmitter unit includes coding the data based on the eigenvalues.

20. The method of claim 19, wherein the processing at the transmitter unit further includes modulating the coded data in accordance with modulation schemes selected based on the eigenvalues.

21. The method of claim 20, wherein the processing at the transmitter unit further includes preconditioning the modulation symbols based on the eigenmodes.

22. The method of claim 1, wherein the CSI is transmitted in full from the receiver unit.

23. The method of claim 22, wherein the CSI is periodically transmitted in full from the receiver unit, and wherein differential updates to the CSI are transmitted between full transmissions.

24. The method of claim 1, wherein the CSI is transmitted when changes in the channel characteristics exceeding a particular threshold are detected.

25. The method of claim 1, wherein the received signals are processed in accordance with a linear spatial processing technique at the receiver unit.

26. The method of claim 25, wherein the linear spatial processing technique is a correlation matrix inversion (CCMI) technique.

27. The method of claim 25, wherein the linear spatial processing technique is a minimum mean square error (MMSE) technique.

28. The method of claim 1, wherein the received signals are processed in accordance with a space-time processing technique at the receiver unit.

29. The method of claim 28, wherein the space-time processing technique is a minimum mean square error linear equalizer (MMSE-LE) technique.

30. The method of claim 28, wherein the space-time processing technique is a decision feedback equalizer (DFE) technique.

31. The method of claim 1, wherein the received signals are processed in accordance with a full-CSI processing technique at the receiver unit.

32. The method of claim 1, wherein the MIMO system implements orthogonal frequency division modulation (OFDM).

33. The method of claim 32, wherein the processing at each of the receiver unit and transmitter unit is performed for each of a plurality of frequency subchannels.

34. A method for transmitting data from a transmitter unit to a receiver unit in a multiple-input multiple-output (MIMO) communication system, comprising:
at the receiver unit,
receiving a plurality of signals via a plurality of receive antennas, wherein the received signal from each receive antenna comprises a combination of one or more signals transmitted from the transmitter unit,
processing the plurality of received signals in accordance with a linear spatial processing technique, a space-time processing technique, or a full-CSI processing technique to provide estimates of modulation symbols transmitted from the transmitter unit,
estimating signal-to-noise-plus-interference ratios (SNRs) for a plurality of transmission channels used for data transmission, and
transmitting the SNR estimates for the plurality of transmission channels back to the transmitter unit; and
at the transmitter unit,
receiving the SNR estimates for the plurality of transmission channels, and
processing data for transmission to the receiver unit based on the received SNR estimates.

35. The method of claim 34, wherein the SNR is estimated for each of the plurality of transmission channels used for data transmission.

36. The method of claim 34, wherein the processing at the transmitter unit includes coding data for each transmission channel in accordance with the received SNR estimate for the transmission channel.

37. The method of claim 36, wherein the processing at the transmitter unit further includes modulating the coded data for each transmission channel in accordance with a modulation scheme selected based on the received SNR estimate for the transmission channel.

38. The method of claim 34, further comprising:
at the receiver unit,
deriving characterizations for the plurality of transmission channels used for data transmission, and
transmitting the characterizations back to the transmitter unit.

39. The method of claim 38, further comprising:
at the transmitter unit,
receiving the characterizations for the plurality of transmission channels, and
preconditioning modulation symbols prior to transmission to the receiver unit in accordance with the characterizations for the plurality of transmission channels.

40. The method of claim 34, wherein the received signals are processed in accordance with a channel correlation matrix inversion (CCMI) technique or a minimum mean square error (MMSE) technique.

41. The method of claim 34, wherein the received signals are processed in accordance with a minimum mean square error linear equalizer (MMSE-LE) technique or a decision feedback equalizer (DFE) technique.

42. A multiple-input multiple-output (MIMO) communication system comprising:
a receiver unit comprising
a plurality of front-end processors configured to receive a plurality of signals via a plurality of receive antennas and to process the received signals to provide received modulation symbols,
at least one MIMO processor coupled to the front-end processors and configured to receive and process the received modulation symbols to derive channel state information (CSI) indicative of characteristics of a plurality of transmission channels used for data transmission, and
a transmit data processor operatively coupled to the MIMO processor and configured to process the CSI for transmission from the receiver unit; and
a transmitter unit comprising
at least one demodulator configured to receive and process one or more signals from the receiver unit to recover the transmitted CSI,
a transmit data processor configured to process data for transmission to the receiver unit based on the recovered CSI to provide modulation symbols, and
at least one modulator coupled to the transmit data processor and configured to condition the modulation symbols to generate a plurality of signals suitable for transmission from the transmitter unit to the receiver unit.

43. A multiple-input multiple-output (MIMO) communication system comprising:
a receiver unit comprising
means for receiving and processing a plurality of signals to provide received modulation symbols,
means for processing the received modulation symbols to derive channel state information (CSI) indicative of characteristics of a plurality of transmission channels used for data transmission, and
means for processing the CSI for transmission from the receiver unit; and
a transmitter unit comprising
means for receiving and processing one or more signals from the receiver unit to recover the transmitted CSI,
means for processing data for transmission to the receiver unit based on the recovered CSI to provide modulation symbols, and
means for conditioning the modulation symbols to generate a plurality of signals suitable for transmission from the transmitter unit to the receiver unit.

44. A multiple-input multiple-output (MIMO) communication system comprising:
a receiver unit comprising
means for receiving a plurality of signals, each comprising a combination of one or more transmitted signals,
means for processing the plurality of received signals in accordance with a linear spatial processing technique, a space-time processing technique, or a full-CSI processing technique to provide estimates of modulation symbols in the one or more transmitted signals,
means for estimating signal-to-noise-plus-interference ratios (SNRs) for a plurality of transmission channels used for data transmission, and
means for transmitting the SNR estimates for the plurality of transmission channels; and
a transmitter unit comprising
means for receiving the SNR estimates for the plurality of transmission channels, and
means for processing data for transmission to the receiver unit based on the received SNR estimates.

45. A receiver unit in a multiple-input multiple-output (MIMO) communication system, comprising:
a plurality of receive antennas configured to receive a plurality of transmitted signals to provide a plurality of received signals;
a plurality of front-end processors coupled to the plurality of receive antennas and configured to receive and process the plurality of received signals to provide received modulation symbols;
a MIMO processor coupled to the plurality of front-end processors and configured to receive and process the received modulation symbols in accordance with a receiver processing technique to provide estimates of modulation symbols in the transmitted signals;
a channel quality estimator coupled to the MIMO processor and configured to estimate characteristics of a plurality of transmission channels used for data transmission and to provide channel state information (CSI) indicative of the estimated channel characteristics; and
a transmit data processor configured to receive and process the CSI for transmission from the receiver unit.

46. The receiver unit of claim 45, wherein the receiver processing technique is a linear spatial technique.

47. The receiver unit of claim 46, wherein the linear spatial technique is a correlation matrix inversion (CCMI) technique or a minimum mean square error (MMSE) technique.

48. The receiver unit of claim 45, wherein the receiver processing technique is a space-time technique.

49. The receiver unit of claim 48, wherein the space-time technique is a minimum mean square error linear equalizer (MMSE-LE) technique or a decision feedback equalizer (DFE) technique.

50. The receiver unit of claim 45, wherein the receiver processing technique is a full-CSI technique.

51. The receiver unit of claim 45, further comprising:
one or more demodulation elements, each demodulation element configured to receive and demodulate a respective stream of modulation symbol estimates in accordance with a particular demodulation scheme to provide a stream of demodulated symbols.

52. The receiver unit of claim 51, further comprising:
one or more decoders, each decoder configured to receive and decode a stream of demodulated symbols in accordance with a particular decoding scheme to provide decoded data.

* * * * *